US007983895B2

(12) United States Patent (10) Patent No.: US 7,983,895 B2
McEntee et al. (45) Date of Patent: *Jul. 19, 2011

(54) SYSTEM AND METHOD FOR GENERATING GRAMMATICALLY CORRECT TEXT STRINGS

(75) Inventors: Robert A. McEntee, San Diego, CA (US); William M. Mauer, Cedar Park, TX (US); Steven J. Riley, Sunnyvale, CA (US)

(73) Assignee: Sony Online Entertainment LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/985,352

(22) Filed: Nov. 9, 2004

(65) Prior Publication Data

US 2006/0100853 A1 May 11, 2006

(51) Int. Cl.
*G06F 17/28* (2006.01)
(52) U.S. Cl. ............. 704/2; 704/3; 704/4; 704/7; 704/8; 715/265
(58) Field of Classification Search .................. 704/2–8; 715/265

See application file for complete search history.

(56) References Cited

U.S. PATENT DOCUMENTS

| | | | | |
|---|---|---|---|---|
| 6,275,789 B1 * | 8/2001 | Moser et al. | ...................... | 704/7 |
| 6,282,712 B1 * | 8/2001 | Davis et al. | ................... | 717/170 |
| 6,760,695 B1 * | 7/2004 | Kuno et al. | ........................ | 704/9 |
| 6,920,419 B2 * | 7/2005 | Kitamura et al. | .................. | 704/2 |
| 7,295,963 B2 * | 11/2007 | Richardson et al. | .............. | 704/2 |
| 2004/0102956 A1 * | 5/2004 | Levin | ................................ | 704/2 |

OTHER PUBLICATIONS

International Preliminary Report on Patentability issued in PCT/US2005/039811, dated May 24, 2007.
Heimburg, Eric "Localizing MMOGs", dated Sep. 12, 2003, http://www.gamasutra.com/view/feature/2809/localizing_mmogs.php, 17 pages.
msg.py—Message System for P00 and other projects, initial copyright Mar. 6, 1997 Amit Patel, http://packages.debian.org/changelogs/pool/main/j/jhcore/jhcore_20050204/jhcore.copyright; http://www.opensource.org/licenses/mit-license.php; and http://theory.standford.edu/~amitp/Python/code/LICENSE, 11 pages.

* cited by examiner

*Primary Examiner* — David R Hudspeth
*Assistant Examiner* — Lamont M Spooner
(74) *Attorney, Agent, or Firm* — Procopio, Cory, Hargreaves & Savitch LLP

(57) ABSTRACT

A system and method for generating grammatically correct text in a target language based on one or more text templates and corresponding context in a source language comprises a software module configured to select one or more source language text templates and corresponding context in the source language. The system also includes a localization engine configured to obtain the selected one or more source language text templates and corresponding context in the target language from memory, apply the target language context to the one or more target language text templates, and apply one or more grammatical rules for the target language, thereby generating a grammatically correct text string in the target language. The system further includes a display configured to display the grammatically correct text string in the target language.

14 Claims, 10 Drawing Sheets

SYSTEM AND METHOD FOR GENERATING GRAMMATICALLY CORRECT TEXT STRINGS

CROSS REFERENCE TO RELATED APPLICATIONS

This application is related to U.S. patent application Ser. No. 10/985,338 entitled "SYSTEM AND METHOD FOR GENERATING A TARGET LANGUAGE MARKUP LANGUAGE TEXT TEMPLATE" and filed on Nov. 9, 2004, and U.S. patent application Ser. No. 10/985,351 entitled "SYSTEM AND METHOD FOR GENERATING MARKUP LANGUAGE TEXT TEMPLATES" and filed on Nov. 9, 2004. The disclosures of the above-described filed applications are hereby incorporated by reference in their entirety.

BACKGROUND OF THE INVENTION

1. Field of the Invention

The invention pertains to the field of text translation and localization. More particularly, the invention pertains to systems and methods for generating grammatically correct strings in a target language based on context and a text template in a source language.

2. Description of the Related Art

Many products configured to display text to a user are used or implemented in locales wherein the language used is different from that of the origin of the product. For example, software applications such as computer games which display text to a user can translate the text for use at the locale at which the game is being played. Similarly, it is often desirable for Internet web pages to be presented to a user in their language of choice, where the text of the web page was originally written in a different language.

Localization of text typically includes translation of a word or phrase by persons familiar with the source language and target language. However, these translators often lack the contextual information they need to provide a grammatically correct translation. For example, translators often use the equivalent of s/he, his/her, and ambiguous passive voice to avoid contextual problems, resulting in a generic if not awkward translation. Unfortunately, grammatical rules are too complex and variable for totally automated software, and software application writers have a different knowledge and focus from that needed for localization of text.

Localized products with generic and awkward translations degrade the international user experience and reduce the overall quality of the product. This poor quality impedes penetration of international markets and leads to lost revenue potential for the product. Some attempts have been made at pure machine translation. However, machine translation is costly in terms of the required processing power and unsatisfying in output quality. In addition, pure static text without any variable content is inflexible. Static text for all possible alternatives is typically expensive, and the quality of the translation suffers by not being specific when there are too few alternatives.

Thus, a text localization tool which generates grammatically correct text in a target language is needed in the technology.

SUMMARY OF CERTAIN INVENTIVE EMBODIMENTS

One embodiment of a system configured to generate grammatically correct text in a target language based on one or more text strings and corresponding context in a source language comprises a software module configured to select one or more source language text templates and corresponding context in the source language, the software module being configured to store the one or more source language text templates and one or more corresponding target language text templates, and context in the source language and corresponding context in the target language. The system further comprises a localization engine configured to obtain the selected one or more source language text templates and corresponding context in the target language from memory, apply the target language context to the one or more target language text templates, and apply one or more grammatical rules for the target language, thereby generating a grammatically correct text string in the target language. The system also comprises a display configured to display the grammatically correct text string in the target language.

The context may include at least one of number, gender, type of object, rank, age, and faction. In one aspect, the software module and localization engine are implemented at a user computer, and the system further comprises a server in communication with the computer via a network, wherein the server is configured to send at least one of the following to the computer: one or more text templates in the source language and the target language, context in the source language and the target language, and a grammar rule for the target language.

The system may further comprise additional localization engines configured to generate grammatically correct text strings in additional target languages, wherein the software module is further configured to store the one or more corresponding text templates in the plurality of target languages for use by the additional localization engines.

One embodiment of a method of generating a grammatically correct text string in a target language based on a text template and context in a source language comprises selecting one or more text templates and context in the source language; obtaining one or more text templates and context in the target language which correspond to the one or more selected text templates and context in the source language; generating a grammatically correct text string in the target language by applying the context in the target language to the one or more text templates in the target language; and displaying the grammatically correct text string in the target language.

Generating the grammatically correct text string may further comprise expanding the one or more text templates in the target language according to one or more grammar rules for the target language. The method may further comprise obtaining the one or more grammar rules for the target language over a network. Obtaining one or more text templates and context in the target language may comprise requesting the one or more text templates and context in the target language over a network and receiving the one or more text templates and context in the target language over the network.

Applying the context in the target language to the one or more text templates in the target language may include using metadata, and obtaining the one or more text templates and context in the target language may comprise accessing a database over a network, and the database may be configured to store at least one of the one or more text strings in the target language and the context in the target language.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

The system is comprised of various modules, tools, and applications as discussed in detail below. As can be appreciated by one of ordinary skill in the art, each of the modules comprises various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system modules, tools, and applications may be written in any programming language such as, for example, C, C++, BASIC, Visual Basic, Pascal, Ada, Java, HTML, XML, or FORTRAN, and executed on an operating system. C, C++, BASIC, Visual Basic, Pascal, Ada, Java, HTML, XML and FORTRAN are industry standard programming languages for which many commercial compilers can be used to create executable code.

Figure 1:
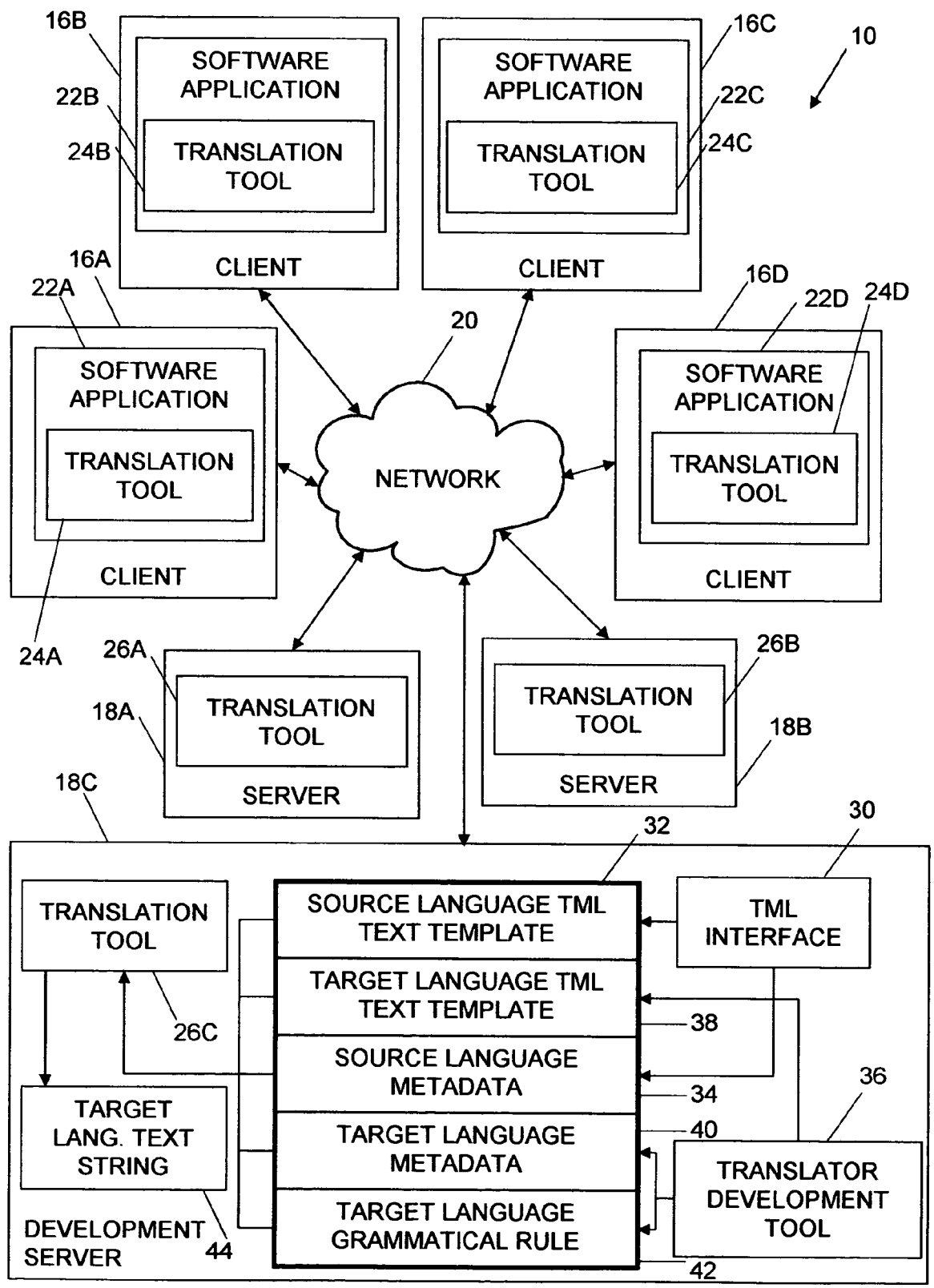
FIG. 1 is a block diagram of one embodiment of a system implementing a text translation tool.

FIG. 1 is a block diagram of one embodiment of a system 10 implementing a text translation tool. The system 10 comprises a plurality of clients 16A-D and a plurality of servers 18A-C coupled to a network 20. The network 20 may include one or more of the following: Internet, Intranet, Local Area Networks (LAN) or Wide Area Networks (WAN). In the system 10, each of the clients 16A-D includes a software application 22A-D having a respective text translation tool 24A-D. The translation tools 24A-D are configured to generate grammatically correct text strings in a target language based on a text template and context in a source language provided by the software application 22A-D.

Alternatively or in addition to the text translation tools 24A-D at the clients 16A-D, the servers 18A-C may include text translation tools 26A-C which function in the same or a similar manner to the text translation tools 24A-D at the clients 16A-D. As will be discussed in further detail hereinafter, grammatically correct text strings may be generated by the translation tools 24A-D at the clients 16A-D, by the translation tools 26A-C at the servers 18A-C by communicating over the network 20, or a combination thereof.

In the system 10 illustrated in FIG. 1, one of the servers is designated the development server 18C. The development server 18C includes a plurality of components used to develop and update of translation tool 26C at the development server 18C. The components include a text markup language (TML) interface 30 which is used to generate a source language TML text template 32 and source language metadata 34 based at least in part on variable elements of a source language text string. As referred to herein, a TML text template is a text template comprising one or more tokens which represent words or phrases in a text string. The translation tool 26C, 24A-D is configured to parse and expand the TML text template to a text string according to context and metadata provided by the software application 22A-D.

Still referring to the development server 18C, a translator development tool 36 is used in conjunction with the source language TML text template 32 to generate a corresponding target language TML text template 38, target language metadata 40, and one or more target language grammatical rules 42. As will be discussed in further detail hereinafter, the translation tool 26C uses the source language TML text template 32, the source language metadata 34, and the corresponding target language TML text template 38 and target language metadata 40 to generate a grammatically correct text string 44 in the target language. In one embodiment, updated or new target language TML text templates and context are provided to the clients 16A-D from one or more of the servers 26A-B via the network 20 periodically.

Figure 2:
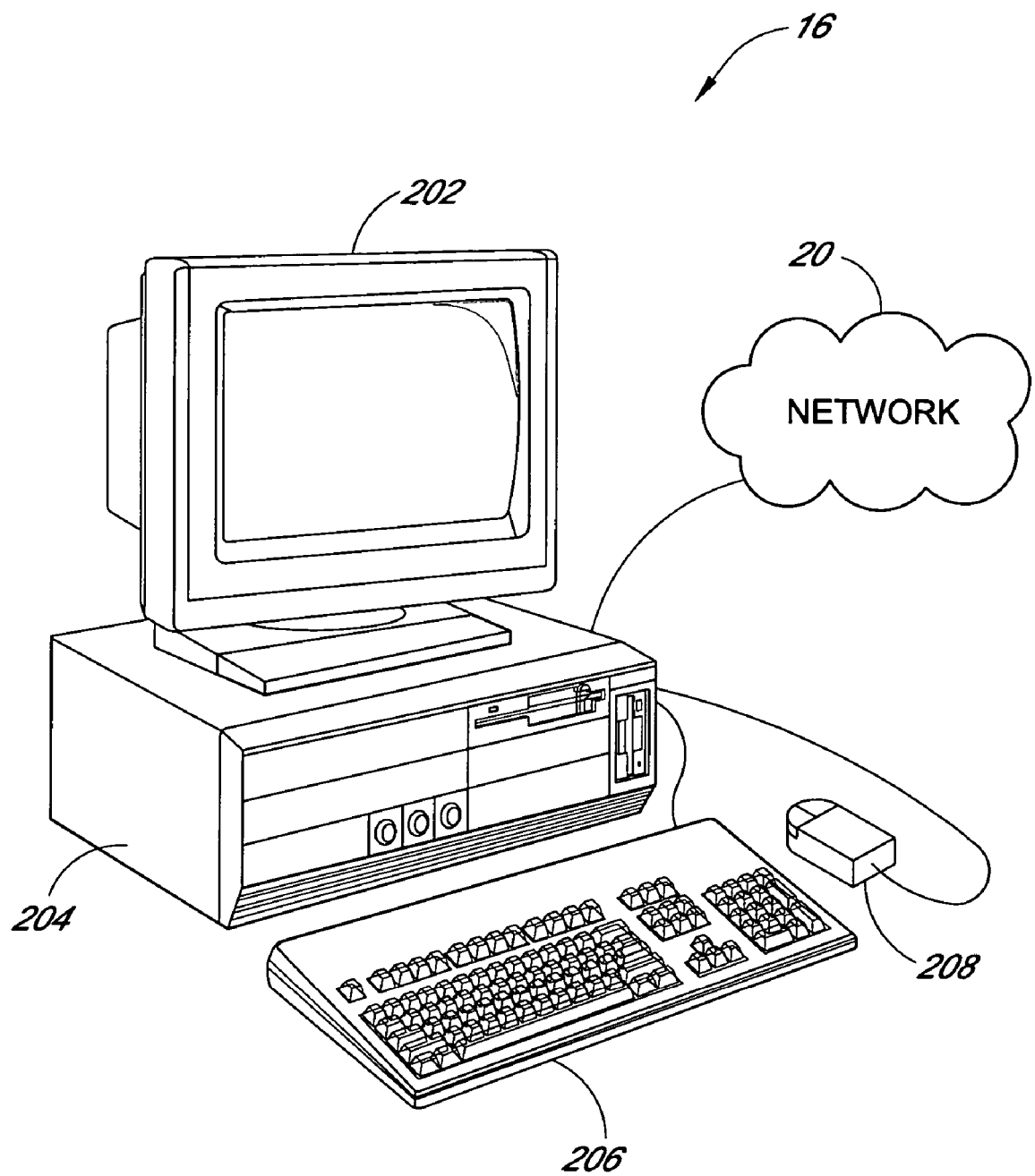
FIG. 2 is an illustration of one embodiment of a client computer coupled to a plurality of peripheral devices and a network for implementation in the system of FIG. 1.

FIG. 2 is an illustration of one embodiment of a client 16 coupled to a plurality of peripheral devices and a network for implementation in the system 10 of FIG. 1. The client 16 comprises a display 202 coupled to a computer 204, and the computer 204 is coupled to the network 20. A plurality of user input devices may be coupled to the computer 204, such as a keyboard 206 and a mouse 208. The user input devices may also include a touchscreen, joystick, trackball, and microphone, for example. The peripheral devices may be coupled to the computer 204 via wired or wireless connections, and the computer 204 may be coupled to the network via a wired or wireless connection. As will be appreciated by those skilled in the technology, the client 16 as described herein is not limited to the device illustrated in FIG. 2, but may be, for example, a personal digital assistant (PDA), cellular telephone, pager, or any computing device configured to display text to a user.

Figure 3:
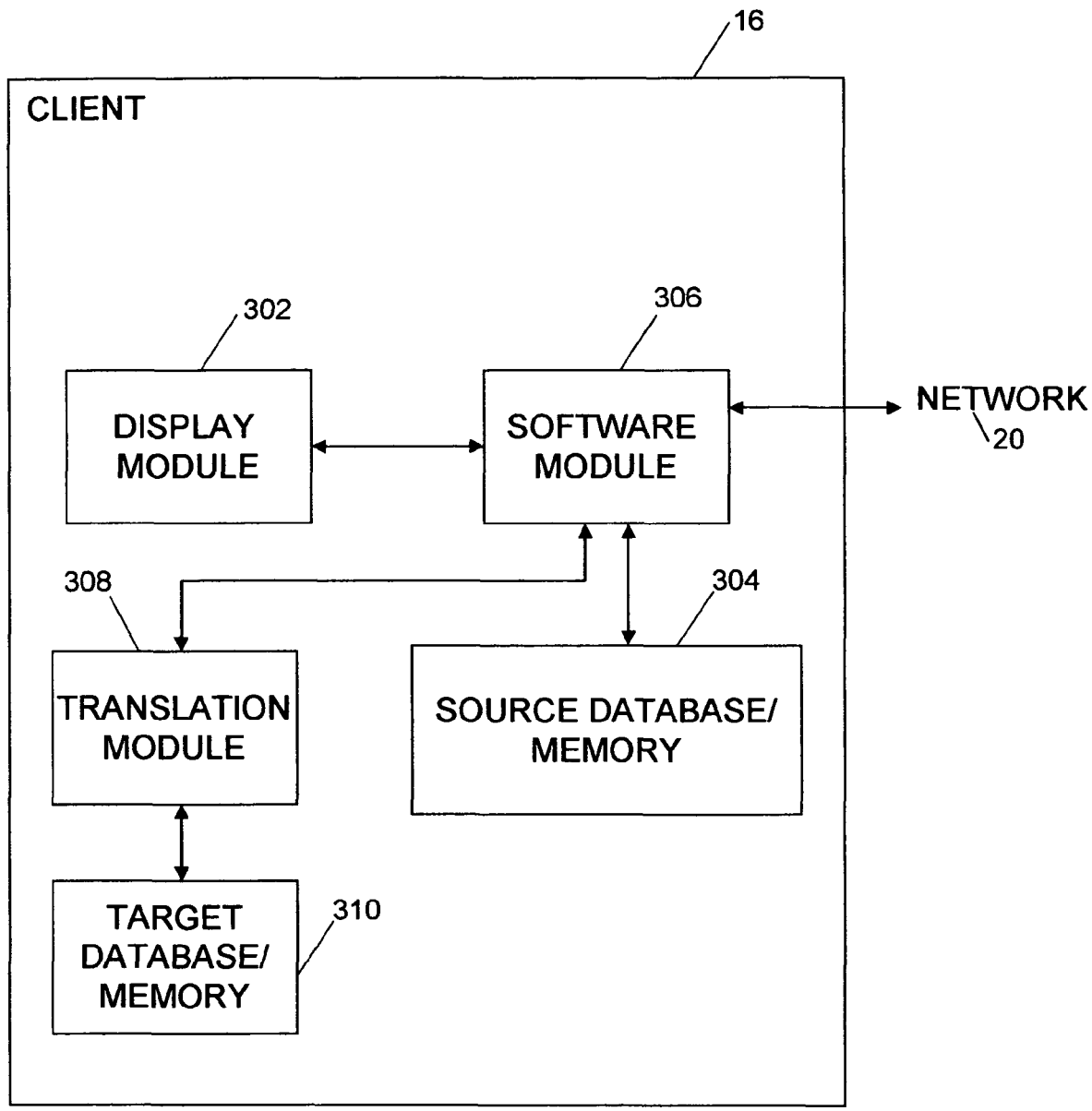
FIG. 3 is a block diagram of one embodiment of a client computer of FIG. 1 including a translation module.

FIG. 3 is a block diagram of one embodiment of the client 16 as coupled to the network 20. The client 16 comprises a display module 302 configured to facilitate display of text at a display such as the display 202 illustrated in FIG. 2. The client 16 further comprises a source database/memory 304 and a software module 306, wherein the software module 306 is configured to coordinate and control communications with the network 20. In one embodiment, the software module 306 and source database/memory 304 implement the software application 22A-D of the system 10 illustrated in FIG. 1. The software module 306 is also configured to communicate with the display module 302 in order to coordinate and control display of text at the client 16 display. The client 16 also includes a translation module 308 in communication with the software module 306, wherein the translation module 308 is configured to generate grammatically correct text in a target language based at least in part on information provided by the software module 306 in a source language. Accordingly, the memory 304 is configured to store information in a source language for use by the software module 306 in conjunction with the translation module 308. The client 16 further comprises a target database/memory 310 in communication with the translation module 308. The target database/memory 310 is configured to store information in a target language for use by the translation module 308 in generating grammatically correct text strings in the target language. In one embodiment, the translation module 308 and the target database/memory 310 implement the translation tool 24A-D of the system 10 illustrated in FIG. 1.

Figure 4:
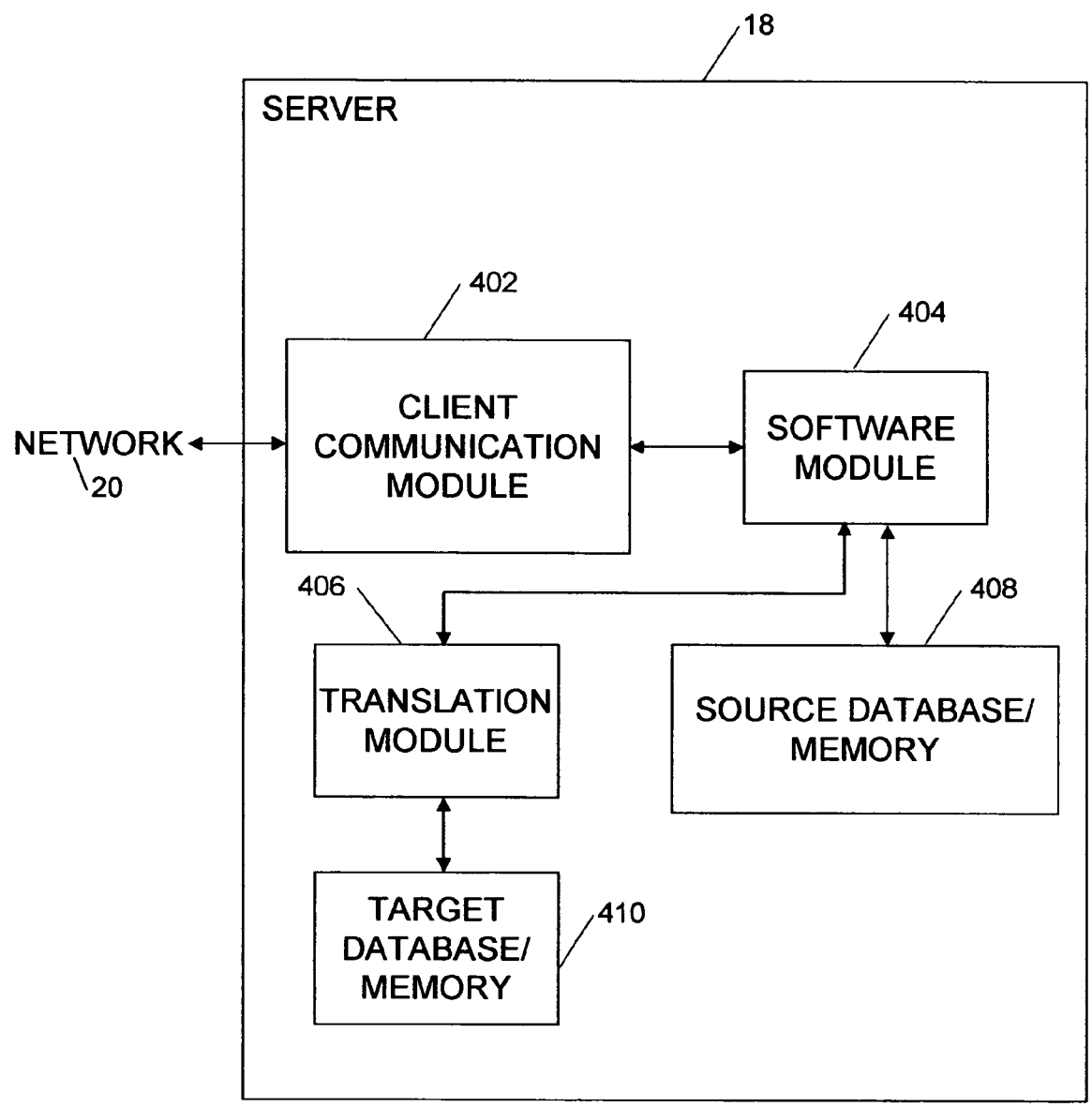
FIG. 4 is a block diagram of one embodiment of a server of FIG. 1 implementing a translation module.

FIG. 4 is a block diagram of one embodiment of the server 18 as coupled to the network 20. The server 18 comprises a client communication module 402 configured to coordinate and control communications with the client or plurality of clients 16 over the network 20. Similar to the client 16, the server 18 comprises a software module 404 and a translation module 406, wherein the software module is configured to provide the translation module 406 with information in a source language, and the translation module 406 is configured to generate text in a target language based at least in part on the information provided by the software module 406 in the source language. The server 18 further comprises a memory 408 or source database, configured to store information in a source language and/or related information for use by the software module 404 in providing information to the translation module 406 and for communicating with the client communication module 402. The server 18 may also include a target database/memory 410 in communication with the translation module 406. The target database/memory 410 is configured to store information in a target language for use by the translation module in generating grammatically correct text strings in the target language. In one embodiment, the translation module 406 and the target database/memory 410 implement the translation tool 26A-B of the system 10 illustrated in FIG. 1.

As will be appreciated by those skilled in the technology, the description and illustration of the client 16 and server 18 are exemplary in nature and are not an exhaustive description of the respective components. In addition, components of the client 16 or server 18 may be combined, such as the source database/memory 308 and the target database/memory 310 at the client.

Figure 5:
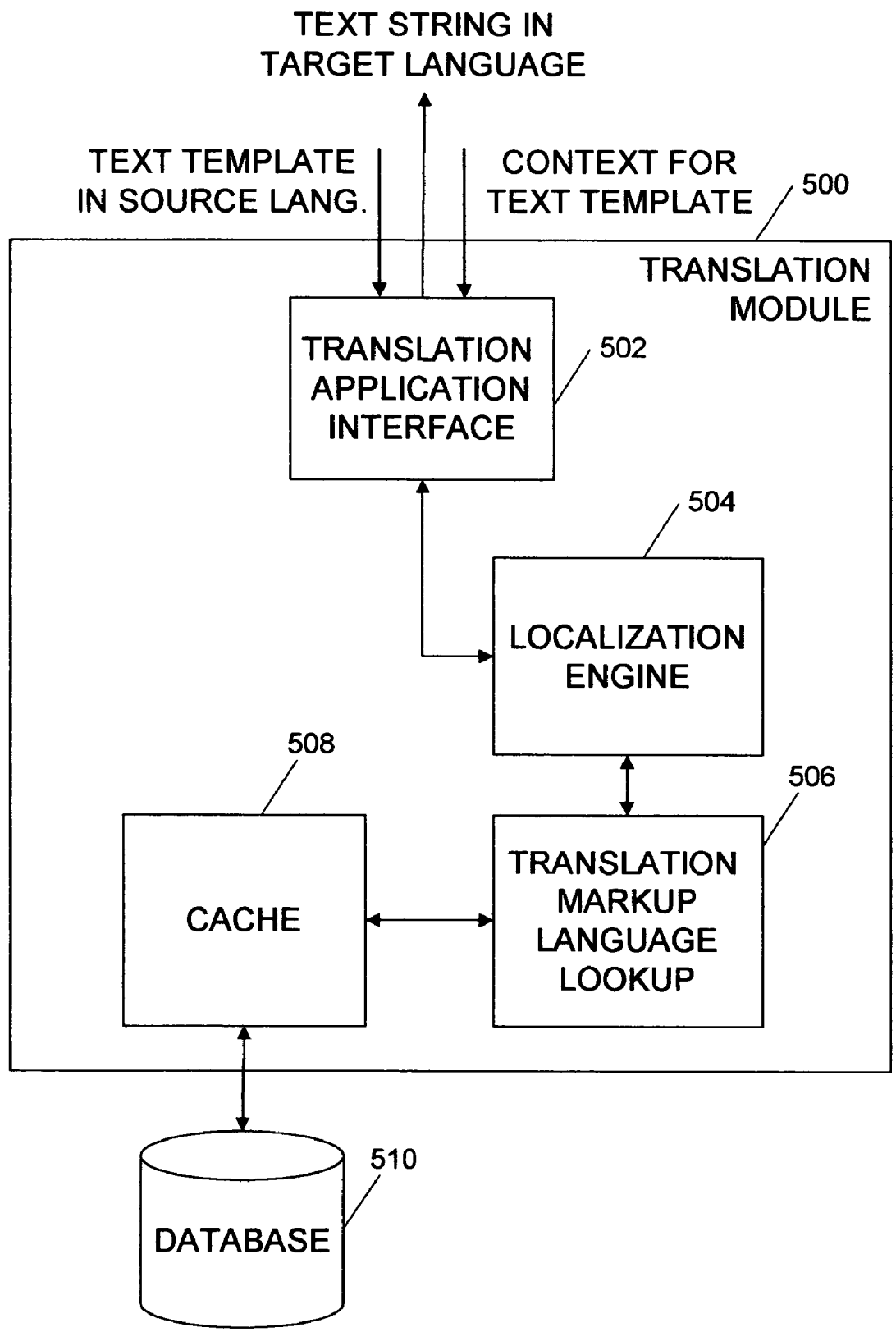
FIG. 5 is a block diagram of one embodiment of the translation module of FIGS. 3 and 4.

FIG. 5 is a block diagram of one embodiment of a translation module 500 which may be implemented as the translation module 308 at the client and/or the translation module 406 at the server 18. The translation module 500 comprises a translation application interface 502 configured to receive a TML text template in a source language and context for the text template in the source language from a software module executing a program such as a game. The translation application interface 502 is further configured to output a grammatically correct text string in the target language. The translation module 500 further comprises a localization engine 504 in communication with a translation markup language lookup module 506, which is in communication with a memory cache 508 and/or a database 510. The database 510 is configured to store a plurality of TML text templates in a source language and corresponding TML text templates in a target language, and context in the source language and corresponding context in a target language.

The localization engine 504 and the TML lookup module 506 are configured to look up the source language TML text template and context in the memory cache 508 or the database 510 and obtain the corresponding text template and context in the target language. The localization engine 504 is further configured to apply the target language context to the TML text template using metadata, and to expand the target language template according to target language grammar rules coded into the localization engine 504. The expanded target language template is output from the translation module 500 via the translation application interface 502 as a text string in the target language. One embodiment of a method of operation of the translation module 500 is discussed in further detail hereinafter in reference to FIG. 10.

Figure 6:
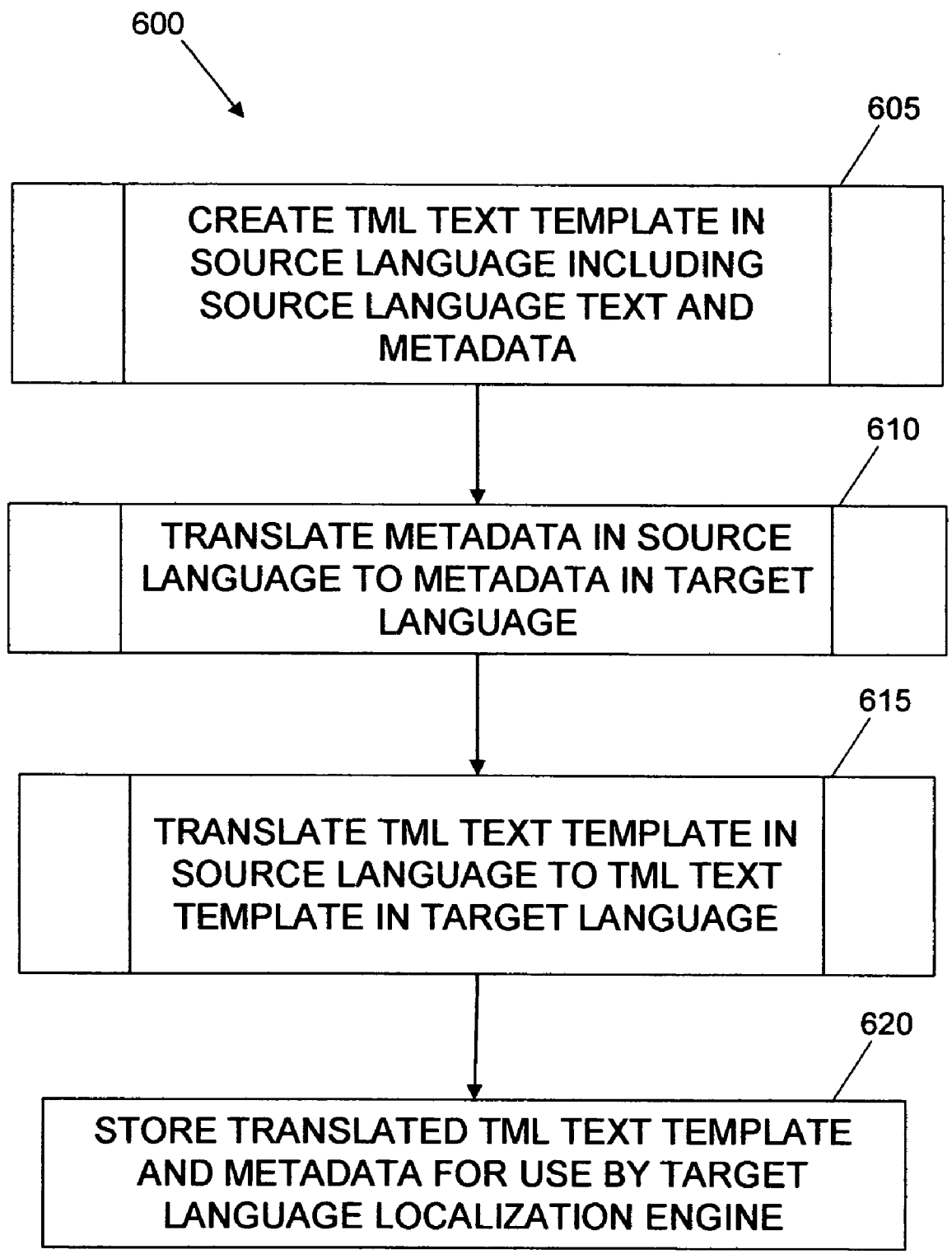
FIG. 6 is a flowchart illustrating one embodiment of a method of generating the text translation tool.

FIG. 6 is a flowchart illustrating one embodiment of a method 600 of generating target language TML text templates for use by the translation modules 308, 406 at the client 16 and/or server 18. The method 600 may be performed manually or it can be automated, or the method may be performed with a combination of manual and automated processes. In a step 605, a TML text template is created in a source language including source language text and metadata using the TML interface 30, for example (see FIG. 1). In one embodiment, step 605 comprises a plurality of process steps which are discussed in more detail hereinafter with respect to FIG. 7. In a step 610, the metadata in the source language is translated to metadata in a target language using the translator development tool 36, for example. In a step 615, the source language TML text template is translated to a TML text template in the target language using the translator development tool 36, for example. In one embodiment, each of the steps 610 and 615 comprise a plurality of process steps which are discussed in more detail hereinafter with respect to FIG. 8. Finally, in a step 620, the translated or target language TML text template and target language metadata are stored for use by a target language localization engine, such as the localization engine 504 (see FIG. 5).

Figure 7:
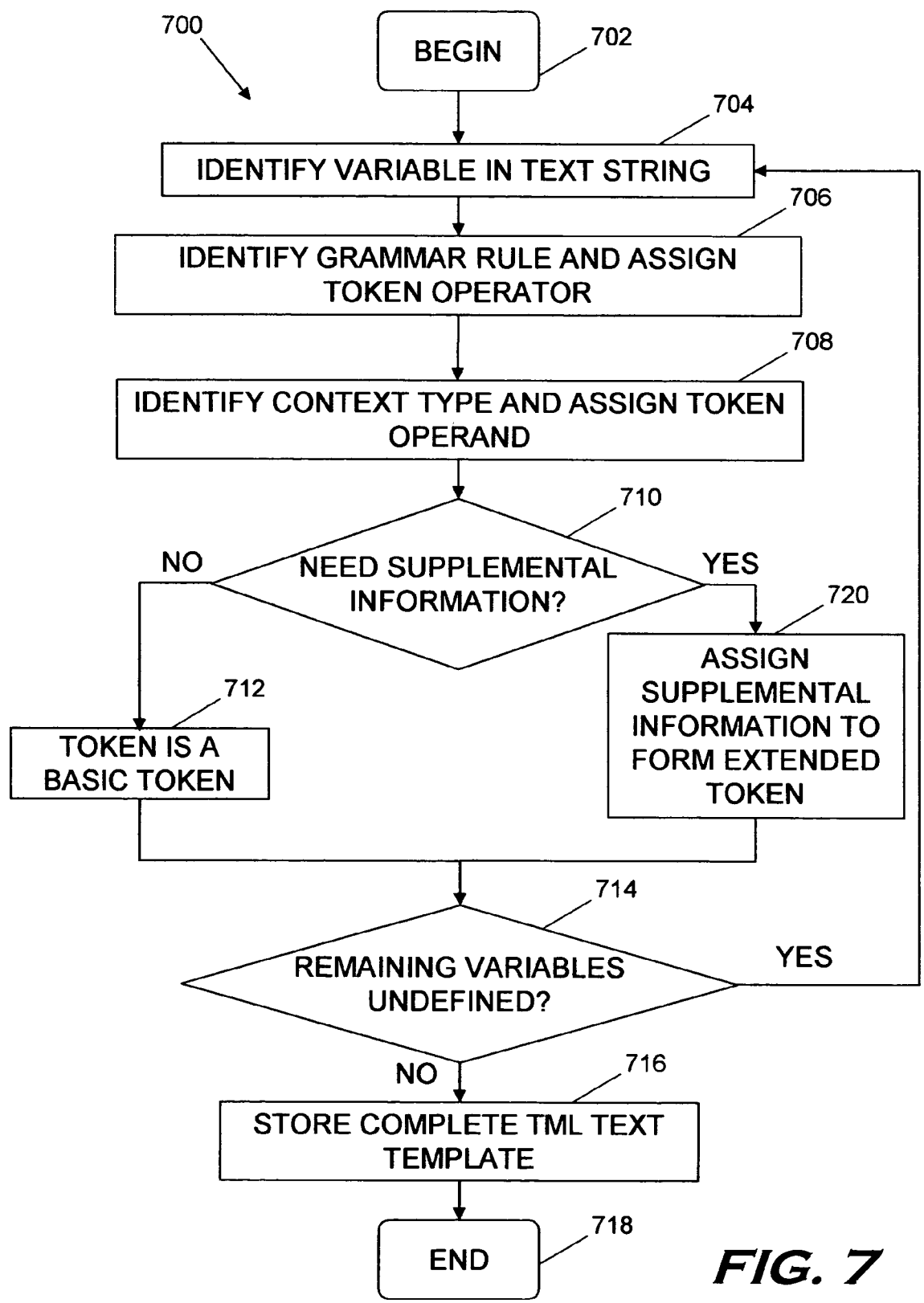
FIG. 7 is a flowchart illustrating one embodiment of a method of generating a translation markup language (TML) text template in a source language based on a text string in a source language.

FIG. 7 is a flowchart illustrating one embodiment of a method 700 of generating a translation markup language (TML) text template in a source language based on a text string in a source language. The method 700 may be performed manually or it may be automated, or may comprise a combination of manual and automated processes. In one embodiment, the method 700 corresponds to step 605 of the method 600. The method 700 begins in a step 702 and proceeds to a step 704 wherein a variable text element in a text string is identified. The following text string will be used as an example to illustrate the method 700:

Emperor Crush pierces you for 23 points of damage.

Instead of storing a text string for every possible combination of targets (Emperor Crush) and number of points of damage in memory, a text template can be generated in TML and parsed according to the target and number of points. According to the method 700 and step 704, the target (Emperor Crush) in the example text string can be identified as a variable text element. In a step 706, a grammar rule for the variable text element is identified and a token operator is assigned to the variable text element. According to one embodiment, a plurality of symbols are designated as token operators, wherein each symbol corresponds to a predefined grammar rule. For example, the following symbols can be predefined to correspond to the designated grammar rules for a variable text element:

$: name (Bob) or base text
^: proper possessive (Bob's)
%: subject pronoun (I-you-he/she/it-we-you-they)
: object pronoun (me-you-him/her/it-us-you-them)
&: possessive pronoun (my-your-his/her/its-our-your-their)
=: direct address (sir/sire/milord-madame/madam/milady)
+: count/number of the objects <: indefinite article (a/an/some)
>: definite article (the)
*: used for locales other than the source locale
~: used for locales other than the source locale In one embodiment, the above symbols are given their normal character representation when doubled. For example, when a text string requires display of the symbol "$", the symbol is written in the TML text template as "$$".

According to the example text string, the identified variable text element "Emperor Crush" is a name and would therefore be assigned the token operator $ in step 706. Following assignment of a token operator in step 706, the method 700 proceeds to a step 708 wherein the variable text element is analyzed to identify the context type for the variable text element and assign a corresponding token operand. For example, the context type may comprise one of actor, target, pet, master, current speaker, current listener, numbered argument, or pointer. Each context type may be assigned a corresponding symbol, such as an alphanumeric character. The following is an exemplary list of symbols and corresponding context types:

0-9: numbered argument
A: the actor, the primary entity that is calling this
T: the target of the current actor
P: the pet of the current actor
M: the master of the current actor
S: the current speaker (pointing to [A, T, P, M, 0-9])
L: the current listener (pointing to [A, T, P, M, 0-9])
@: a this pointer (A if called as actor, T as target, etc.)

For the example text string, the context type of the variable text element "Emperor Crush" is a target. Thus, according to the above exemplary symbol definitions, the variable text element would be assigned the token operand "T". Thus, upon completion of step 708 in the method 700 for the example text string, the partially formed TML text template would be as follows:

$T pierces you for 23 points of damage.

In one embodiment, if the token operand (A, T, P, M, S, L) is capitalized, such as in the example text template, the first character of the expanded token is force capitalized. If the token operand is lower case (a, t, p, m, s, l), the case of the expanded token is unchanged. For example, for the token "$a" when a="Boomba", the expanded token retains the original capitalization.

Following assignment of the token operand in step 708, the variable text element is analyzed in a step 710 to determine whether supplemental information should be assigned. In one embodiment, supplemental information may include at least one of supplemental details and supplemental directives. Supplemental details provide details such as gender or count information specified by another operand, identification of conversational roles such as first person, second person, or third person, and a supplemental directive directs the localization engine 504 to grammatical rules for the target language stored in memory. Directives are less applicable where the source language is English, but become more useful in a target language such as German. Directives may override the count or gender for a variable text element, and can force capitalization of the variable text element. Force capitalizing for numbered token operands can be accomplished using supplemental information to form an extended token. Supplemental information may be designated with a symbol such as "|", and the supplemental symbol followed by any of the characters A, T, M, P, S, L, 0-9 directs the localization engine 504 to that source (A, T, M, P, S, L, 0-9) to obtain context for the expansion of the current token. In one embodiment, the symbol "|" followed by a parenthesis "(" introduces a directive. Supplemental information is discussed in more detail below in reference to step 720 of the method 700.

If it is determined in step 710 that no, the variable text element does not need supplemental information, then the method proceeds to a step 712 where the variable text element can be identified as a basic token. The method 700 then proceeds to a step 714 wherein the text string is analyzed to determine whether there are any remaining variable text elements undefined with a token. If it is determined in step 714 that no, there are no remaining variable text elements, then the method 700 proceeds to a step 716 where the completed TML text template is stored in memory, such as the source database/memory 304 of the client 16 (FIG. 3), and the method ends in a step 718.

If it is determined in step 714 that yes, there are remaining variable text elements in the text string which are undefined with tokens, the method 700 returns to step 704 wherein the next variable text element in the text string is identified. For the example text string, the analysis in step 714 would result in the determination that yes, there are remaining variable text elements undefined. The method 700 would thus return to step 704 and identify the next variable text elements as "23 points". The number "23" is the count for the quantity of the base text, which is "point" in this example. According to the above exemplary grammar rule symbol assignments, the token operator for the count is "+" and the token operator for the base text point is "$". Because the variable text element "23 points" is neither the actor, target, pet, master, current speaker, or current listener, the base text "point" is assigned a single digit numbered argument token operand according to the above context type definitions in step 708. For example, "point" in this example can be assigned the numbered operand "0". At this point in the method 700 for the example text string, the TML text template would be as follows:

$T pierces you for +0 $0 of damage.

Where the given context is defined according to the original text string, that is where "T" is defined as "Emperor Crush" and "0" is defined as "point" with a count of 23, supplemental information would not be needed in step 710 for this text string and the method would proceed to step 712 where the tokens are identified as basic tokens. In step 714, because there are no remaining text variable elements in the example text string, the method proceeds to step 716 wherein the above TML text template is stored in memory, such as the source database/memory 304 of the client 16 (FIG. 3). The method 700 ends in a step 718.

In one embodiment, the base text for each token operand is singular, and the localization engine 504 generates the plural form of the text as needed. In one embodiment, the standard rules for pluralization are based on the last letter(s) of a word and the rules are stored in memory for use by the localization engine 504. Pluralization rules for English can be defined as follows:

| Ends in | Plural | Such as |
|---|---|---|
| *fe | *ves | (knife) |
| *ff | *ffs | (skiff) |
| *f | *ves | (wolf, calf) |
| *h | *hs | unless "*ch" or "*sh" |
| *ch | *ches | (switch) |
| *sh | *shes | (bush) |
| *o | *oes | unless "kangaroo", "piano", "studio", or "zoo" |
| *s | *ses | (glass) |
| *x | *xes | (box) |
| *y | *ies | unless "*ay", "*ey", "*oy", or "*uy" |

-continued

| Ends in | Plural | Such as |
|---|---|---|
| *ay | *ays | (day) |
| *ey | *eys | (Turkey) |
| *oy | *oys | (boy) |
| *uy | *uys | (guy) |
| *z | *zes | (buzz) |

Some irregular words are plural by nature (scissors, police, people) and follow irregular rules for pluralization (cactus, datum, focus). Such irregular plurals can be handled with metadata and are discussed in further detail hereinafter with regard to variant text.

Some base text requires an indefinite article (e.g., a, an, the) for correct grammar. The following text string can be used to illustrate one method of using indefinite articles:

An orc pawn pierces you for 3 points of damage.

According to the method 700, the first variable text element is identified in step 704, and for this example the first variable text element would be "orc pawn". This first variable text element can be assigned the token operator "$" in step 706 since it is standard base text. In step 708, the variable text element "brc pawn" can be assigned the token operand "t" because it is the target. In one embodiment, the method 700 may include the addition of an indefinite article token to the text template. In the present example, where the target is an orc pawn, the indefinite article token operator "<" is assigned, and the token operand for the indefinite article is the target "T". In response to the indefinite article operator, the localization engine 504 analyzes the base text of the operand "T", which in this case is "orc pawn", and determines which indefinite article to use according to a set of rules stored in memory. In the present example, the localization expands the indefinite article token with "an" because the base text for the operand starts with a vowel. In addition, because the operand is capitalized, the expanded token will also be capitalized to be "An". Similarly, because the target "orc pawn" is not at the beginning of the sentence and is not a proper noun, the text should not be capitalized. Accordingly, the token operand in the target token "$t" is not capitalized.

Following assignment of the token operand "t" for the variable text element "orc pawn", the method would move to step 710 where the variable text element and text string are analyzed to determine whether supplemental information should be assigned. In the present example it can be assumed that the target will not be assigned base text that is not a proper noun, and therefore no supplemental information should be assigned in step 710. Thus, the method moves to step 712 where the token is defined as a basic token. In step 714, the text string has remaining variable text elements which are undefined, so the method returns to step 704. In step 704, the next variable text element is "point" as in the previous example. As discussed in the previous example, the variable text element "point" can be assigned the tokens "+0 $0" to call out the count of the base text and the base text itself. After assignment of the tokens for the variable text element "point", the TML text template is complete and stored in memory in step 716.

Given the following context and text template, the localization engine 504 would expand the template and output a grammatically correct text string:

| target | "orc pawn", 1 |
|---|---|
| 0 | "point", 3 |
| template | "<T $t pierces you for +0 $0 of damage." |
| output | "An orc pawn pierces you for 3 points of damage." |

In one embodiment, the target tokens may comprise an article function wherein the target base text may or may not be a proper noun. In one embodiment, the two tokens for the indefinite article (<T) and the target base text ($T) can be replaced with a single token using article functions. The replacement token in the present example would be "<(T)", wherein the localization engine 504 analyzes the operand within the parenthetical to determine whether it is a proper noun in response to the indefinite article operator "<". If the operand within the parenthetical is not a proper noun, the localization engine 504 inserts the appropriate indefinite article (a or an), inserts a space, and adds the base text for the target "orc pawn". As discussed above, where the operand is capitalized, the first letter of the base text is force capitalized. For the token "<(T)", the localization engine 504 capitalizes the indefinite article (if assigned) instead of the base text for the target. For the case where the target base text is a proper noun, such as "Emperor Crush", the localization engine 504 suppresses the indefinite article and does not insert a space.

In one embodiment, the localization engine 504 determines whether base text is a proper noun according to metadata provided with the context. The use of metadata is discussed in more detail hereinafter below in reference to FIG. 8 for example. In one embodiment, proper nouns may be less common than improper nouns and therefore designating improper nouns in the context is more efficient than defining all improper nouns with their appropriate indefinite article in the context. In one embodiment, a proper noun is identified in context with the symbols "{np}". Thus, given the following context and text template, the localization engine 504 would expand the template and output a grammatically correct text string:

| target | "{np} Emperor Crush", 1 |
|---|---|
| 0 | "point", 1 |
| template | "<(T) pierces you for +0 $0 of damage." |
| output | "Emperor Crush pierces you for 1 point of damage." |

In one embodiment, the localization engine 504 adds a definite article and space in a manner similar to the addition of an indefinite article. As discussed above, in one embodiment the symbol ">" corresponds to a definite article token operator. Thus, the localization engine 504 will analyze the token operand in response to the definite article token operator and determine whether the base text for the token operand is a proper noun. If the base text is not a proper noun, the indefinite article "the" is inserted, followed by a space, and the base text is inserted. For the following context and template wherein the target is not a proper noun, the localization engine 504 will expand the template and produce the appropriate output:

| target | "orc pawn", 1 |
|---|---|
| template | ">(T) falls silently to the ground, and lies still." |
| output | "The orc pawn falls silently to the ground, and lies still." |

When the target is a proper noun as identified by the provided context metadata ({np}), the localization engine 504 suppresses the indefinite article and generates the output accordingly:

| | |
|---|---|
| target | "{np} Emperor Crush", 1 |
| template | ">(T) falls silently to the ground, and lies still." |
| output | "Emperor Crush falls silently to the ground, and lies still." |

In one embodiment, the localization engine 504 will select the indefinite article "some" when the base text for the token operand is plural, that is when the count is greater than one. For example, given the following context and template, the localization engine 504 will expand the template using the context to generate the appropriate output text string:

| | |
|---|---|
| actor | "Arwen", 1 |
| target | "Boomba the Big", 1 |
| 0 | "adequate tin breastplate", 1 |
| template | "$T says, 'Greetings $a, you look like you could use <(0).'" |
| output | "Boomba the Big says, 'Greetings Arwen, you look like you could use an adequate tin breastplate.'" |

When the context is changed such that the base text for the numbered argument has a count greater than one, the indefinite article for the token operand "0" will be "some" instead of "a" or "an". For example, when the numbered argument "0" is defined as "arrow" with a count of 20, the following template is expanded to generate the appropriate output text string:

| | |
|---|---|
| actor | "Arwen", 1 |
| target | "Boomba the Big", 1 |
| 0 | "arrow", 20 |
| template | "$T says, 'Greetings $a, you look like you could use <(0).'" |
| output | "Boomba the Big says, 'Greetings Arwen, you look like you could use some arrows.'" |

The use of a modified indefinite article can be further customized for particular counts, wherein the indefinite article inserted is "a couple", "a few", "several", or "many", for example, depending on the count of the token operand.

In the event more information about a variable text element is needed in order to accurately expand a token, supplemental information can be provided in addition to the token operator and operand to form an extended token in a step 720 of the method 700. In one embodiment, a designated symbol is defined as a supplemental operator. For example, the symbol "|" can be designated the supplemental operator for the TML. As discussed briefly above, supplemental information can be details such as missing gender or count information from another variable text element, identification of conversational roles such as second person verb forms, and the supplemental information may include directives to target language grammatical rules stored in memory.

Directives can override the count (ct=) or gender (sx=), or force capitalization (cap) in output text. In one embodiment, both the count and gender can be overridden together off another object (obj=). In one embodiment, the capitalization directive is only needed for capitalizing numbered arguments where there is no way to capitalize the token operand symbol (0-9). Directives may be more useful in target languages other than English. Where the target language is German, for example, the directive list may include the directive "acc" to command use of accusative cases and endings, "dat" to command use of dative cases and endings, "der" to command 'der word' endings, "gen" to command genitive cases and endings, "inf" to command the infinitive form of a verb, "neg" to command the negative form "kein" for an indefinite article or zero count, "nom" to command nominative cases and endings, "par" to request the participle form of a verb, "pas" to command past tense from a verb stem, "pre" to command the present tense form of a verb stem, "rel" to command the relative pronoun form, "sep" to request the separable prefix for a verb, "str" to command strong adjectival endings, "sub" to command subjunctive tense from a verb stem, "wea" to command weak adjectival endings, and "wor" to command small numbers be printed as words.

The following is an example of the application of a directive where English is both the source and target language, and the directive for capitalization is called for the numbered token operand "0" with the supplemental operator "|":

| | |
|---|---|
| 0 | "orc pawn", 1, male, subhuman |
| 1 | "point", 3 |
| template | "<0|(cap) $0 pierces you for +1 $1 of damage." |
| output | "An orc pawn pierces you for 3 points of damage." |

In one embodiment, supplemental details ("$0|a") provide missing gender and count context. In some embodiments they are most useful for verbs and phrases, but can also be of use for articles and direct address. For a verb, supplemental details provide gender and count of the sentence subject. In one embodiment, the default is male, singular, normal status, and third person. For a phrase, the supplemental details show gender and count to be selected. In one embodiment, the default is male singular. For an adjective, some target languages require the gender and count of the noun to determine the adjective ending. Supplemental information provides direct address tokens (=) with additional information if the viewpoint is not that of the speaker. Supplemental information for indefinite article tokens (<) provides information if the operand is an adjective, and the count comes from the noun, which is another variable text element.

For example, if a verb is assigned to numbered argument 1, then the extended token "$1|t" instructs the localization engine 504 to look to the target to determine whether the subject is plural ("he buys" vs. "they buy"). The extended token "$1|S" identifies that the speaker is talking in the first person ("I buy" or "we buy"). Similarly, the extended token "$1|L" identifies the speaker is addressing the listener in the second person ("you buy"). Verb forms vary more widely for some target languages other than in English.

The designations for speaker and listener are slightly different metadata, wherein they identify conversational roles and which token operand (target, master, pet, numbered argument) is the speaker and which is the listener. For example, if the target is speaking, many tokens containing the speaker operand "S" are the same as tokens containing the target operand "T". For example the token "$S" is equivalent to the token "$T", the token "+S" is equivalent to the token "+T", the token "<S" is equivalent to the token "<T", etc. However, when the speaker uses the pronoun for himself/herself, the designation is first person, wherein the token "% s" could be parsed with "I/we", the token "#s" could be parsed with "me/us", and the token "&s" could be parsed with "my/our", for example, depending on the count. When the speaker uses the pronoun for the listener, the designation is second person wherein the tokens "%l" and "#l" could be parsed with "you", and the token "&l" could be parsed with "your/your", for example, depending on the count. This feature is generally more useful for target languages other than English. For example, Asian languages such as Japanese can have a plurality of options for first and second person pronouns.

In one embodiment, the designations for speaker and listener are also used in selecting first and second person verb forms. Like with pronouns, when the speaker is speaking about the speaker, s/he is using first person. When the speaker is talking about the listener, s/he is using second person. These cases are discussed in more detail in reference to variant text. In some embodiments, the designations for speaker and listener ("S" and "L") are also used when designating forms of direct address (sir/milady). For example, the token "=L" is a token for a direct address from the speaker to the listener. In certain embodiments, at least one of the station and faction of both the person being addressed and the person speaking make a difference as to which direct address is used. Table 1 is an exemplary listing for use by the localization engine 504 in determining which direct address to use.

TABLE 1

| Station | Bad faction | Neutral faction | Good faction |
|---|---|---|---|
| Extra high | You | Milord/milady | Milord/milady |
| High | You | Sire/madam | Sire/madam |
| Neutral | You | Sir/madame | Sir/madame |
| Low | You | Friend | Champion |
| Extra low | You worm | Neophyte | Helper |

The entries in Table 1 are based on the speaker being of a lower station than the listener. When the speaker is of a higher station than the listener, the localization engine 504 will use either "sir" or "madame" for a direct address, depending on the gender of the listener. When the translation tool is implemented in a game, for example, using a direct address is an opportunity to address the player more deferentially as they advance in the game.

Similar to Table 1, a table for direct address can be provided for a target language such as German, wherein Table 2 is an exemplary direct address table for use by the localization engine 504 in determining which direct address text to use when called by the "=" token operator:

TABLE 2

|  | Bad faction | Neutral faction | Good faction |
|---|---|---|---|
| Extra high | Fremdling | Edler Herr | Edler Herr |
|  | Fremde | Edler Dame | Edler Dame |
| High | Fremdling | Verter Herr | Verter Herr |
|  | Fremde | Verter Dame | Verter Dame |
| Neutral | Fremdling | Mein Herr | Mein Herr |
|  | Fremde | Meine Dame | Meine Dame |
| Low | Fremdling | Freund | Mitstreiter |
|  | Fremde | Freundin | Mitstreiterin |
| Extra low | Du Worm | Neuling | Gehilfe |
|  | Du Worm | Neuling | Gehilfin |

The formation of a TML text template for the following text string will be discussed in reference to FIG. 7 and the method 700 and illustrates the use of supplemental information.

"Buy my stuff!"

In the present example, the first variable text element in the text string can be identified in step 704 as the verb "buy". Because the variable text element is standard base text it can be assigned the token operator "$" in step 706. Because the variable text element is not an actor, target, pet, or master, it can be assigned the numbered token operator "0" in step 708. When the method continues to step 710, the variable text element is analyzed to determine whether supplemental information should be assigned. In the present example, since the variable text element is a verb, the localization engine 504 will typically need to know which verb form to use when expanding the text template. The supplemental information for the verb "buy" in the present example would include the supplemental detail that the speaker is addressing the listener. Accordingly, the supplemental information "|L" is assigned to the token "$0" in step 720 to form an extended token.

In addition to the supplemental information regarding the verb form, the variable text element "buy" should be capitalized in the present example because it is at the beginning of a sentence. Accordingly, the supplemental directive "|(cap)" is added to the token for the variable text element to form the extended token "$0|L|(cap)" for the variable text element "buy" in the present example.

Following assignment of supplemental information to the first variable text element to form an extended token in step 720, the text string is analyzed in step 714 to determine whether there are remaining variable text elements that are undefined with TML. In the present example there are remaining undefined variable text elements, and the possessive pronoun "my" can be identified as a variable text element in step 704 as the method returns to step 704. In step 706, the variable text element can be identified as a possessive pronoun and therefore assigned the token operator "&" in step 706 according to the exemplary definitions above. The context type for the variable text element is the current speaker and the variable text element should be lower case, therefore the token operand "s" is assigned in step 710. Upon analysis in step 710, the variable text element should not be assigned supplemental information and therefore is identified as a basic token in step 712. Upon analysis in step 714, there are no remaining variable text elements undefined in the exemplary text string and the completed TML text template is stored in memory in step 716.

The TML text template can be expanded with the following context to output a grammatically correct string. The verb syntax is discussed in more detail hereinafter with respect to variant text and metadata.

| listener | "Boomba the Big", 1 |
| 1 | "{v}buy{ts=buys}" |
| template | "$1|L|(cap) &s stuff!" |
| output | "Buy my stuff!" |

In one embodiment, where an extended token includes both supplemental details and supplemental directives, the supplemental details are first, followed by the directive(s) as illustrated in the above example. Extended tokens may also include a directive to look up an identification or numbered location in memory and apply context from a defined variable text element. Phrases can also be adjusted by supplemental details for gender and count. For example, a wanderer of the female gender could say "these stiletto heels are killing my feet", while a wanderer of the male gender would say "these cowboy boots are killing my feet". Gender is less of a grammatical issue in the English language than it is in other target languages.

In French and German, for example, the localization engine 504 modifies an adjective depending on the gender and count of the noun it applies to ("$2|3"). Because such adjustments are typically not a factor when both the source and target language are English, the use of directives is more appropriately discussed in reference to FIG. 8 and the definition of a target language localized template.

As discussed above, the localization engine 504 expands a TML text template using context provided by the software application. The context may comprise a single word or combination of words, such as "Fippy Darkpaw", or the context may include metadata which provides information about the base text, such as "{n}Fippy Darkpaw". In one embodiment, metadata is used to indicate default and override information for the base text, such as the part of speech, gender, faction, rank, age, and type of object. Overrides provided as metadata in the context of base text can be referred to as static overrides. In one embodiment, a static override is applied as the localization engine 504 applies given context to a TML text template, and override directives in the TML text template are applied after the static overrides during expansion of the TML text template.

For example, where a target is defined as "Fippy Darkpaw", the localization engine 504 will expand the token "$t" in a TML template to "Fippy Darkpaw". However, if the software application fails to provide the localization engine 504 with a gender for Fippy, the default gender can be set to male with the metadata "sx=m", wherein the context supplied would be "{n, sx=m}Fippy Darkpaw". The default gender provided in the static default is overridden with gender context provided by the software application. However, the context can be modified to the more definitive "{n, sx!=m}Fippy Darkpaw" such that the gender provided by the context metadata overrides a gender provided by the software application. The definitive static override may be particularly useful for target languages wherein an object is always given a particular grammatical gender, regardless of the gender of the object in reality. For example, a ghost in German is always assigned a grammatically male gender regardless of whether the ghost is female or male.

The context can also be adjusted according to locale sensitivities. For example, in an Islamic nation a crusader character in a game may be unpopular. Accordingly, the honorific for a crusader can be overridden with the symbol "!" as follows:

{n, sx=m, hn!=−2}crusader

The use of the "!" symbol in defining the honorific instructs the localization engine 504 to ignore context provided by the software application. As in the Fippy Darkpaw example, if the software application does not supply gender then the default male gender is used. Thus, the localization engine 504 first applies static defaults during application of the context to the TML text template, then the TML text template is expanded and dynamic overrides are applied, and finally static overrides are applied.

Defaults and overrides may be specific for each locale and target language and are stored in the target/database memory (310/410) for example. In one embodiment, the following defaults and overrides are available:

1) sx or sx!—gender for that context slot
   male
   female
   neuter (n/a, or the German neuter)
   both (a mixed group containing both males and females)
2) ct or ct!—count for that token operand (numeric starting at 0)
3) be or be!—type of being
   human
   subhuman
   animal
   monster
   undead
   object 4) hn or hn!—honor or respect level
   −2 for extra low
   −1 for low
   0 for normal
   1 for high
   2 for extra high
5) ag or ag!—age (numeric starting at 0)

In one embodiment, the first character is sufficient to set the gender (m, f, n, or b) or type of being (h, S, a, m, u, or o). More letters can be supplied to improve readability as desired ("sx!=female").

In one embodiment, the context contains no variants or overrides and is optimized for speed in generating a grammatically correct text string in the target language. The symbol "{" can be designated to indicate additional information about the base text, as discussed above. Thus, if the localization engine 504 does not detect the symbol "{", then the base text is copied from the context definition without modification.

bone chip
{n}bone chip
{n}bone chip {pl="bone chips"}

All three of these examples are output the same by the localization engine 504: "bone chip" if singular and "bone chips" if plural. A first context block adds or extends the metadata by adding information to the context. In one embodiment, the first context block ({n} for the present example) identifies the part of speech (e.g., noun, verb, adjective, or phrase) for the base text. The first context block may also comprise the static defaults and overrides for contextual data, such as gender and honorific level discussed above. Predefined variants of the base text, such as unusual plural forms or different forms according to assigned gender, can be defined using metadata. These predefined variants can be referred to as variant text.

The following is an exemplary list of variant identifiers for nouns, verbs and phrases:

{n} or {np}—nouns or proper nouns
   f= or fem= for feminine
   fs= for feminine singular
   fp= for feminine plural
   f3-6= for feminine, ranged plural ("a few actresses")
   f20= for feminine, specific count ("a stack of hit women")
   m= or mas= for masculine
   ms= for masculine singular
   mp= for masculine plural
   m3-6= for masculine, ranged plural ("a few actors")
   m20= for masculine, specific count ("a stack of hit men")
   pl= for plural
   si= for singular
   3-6= for ranged plural ("a few spider silks")
   20= for specific count ("a stack of batwings")
{v}—verbs
   1s= or fs= for first person singular
   2s= or ss= for second person singular
   3s= or ts= for third person singular
   1p= or fp= for first person plural
   2p= or sp= for second person plural
   3p= or tp= for third person plural
{p} or {pl} or {ps}—phrases; {ps} keys off speaker, {pl} keys off listener.
   f= or fem= for feminine
   fs= for feminine singular
   fp= for feminine plural
   m= or mas= for masculine ms= for masculine singular
mp= for masculine plural
pl= for plural
si= for singular The singular or "si=" variants provide symmetry and can be identified specifically with metadata. In one embodiment, the default or base text is the singular version of the text.

In one embodiment, the localization engine 504 uses the first context block identifying the part of speech, such as {n} for noun, as a basis for parsing the variant text. The second "{}" context block, or variant block, recites the variant text. For example, the base text "hit man" can be assigned the following metadata:

{n, sx=male}hit man {fs="hit woman", fp="hit women", pl="hit men"}

The first context block identifies the base text as a noun and assigns a default gender of male. The second text block lists the variant forms of a "hit man" according to whether the gender is male or female, and whether the count is singular or plural. In one embodiment, two characters can be used to identify the case in which the variant text is to be used. In the present example, the characters "fs" identify the case where the gender is female and the count is singular or one, the characters "fp" identify the case where the gender is female and the count is plural or greater than one, and the characters "pl" identify the case where the count is plural or greater than one and no gender is provided.

According to the default gender, the base text is assumed male unless the software application provides context to the contrary. However, if the software application designates that the gender is female, then the localization engine 504 uses the text "hit woman" if the count is singular and "hit women" if the count is greater than one. Similarly, if the count is greater than one and no gender information is provided, the general plural text "hit men" is used. In one embodiment, the localization engine 504 assumes the first space or comma mark after a series of characters indicates the end of the variant text. If the variant text contains a single quote ('), the text is wrapped in double quotes ("), and if the text contains a double quote ("), the text is wrapped in single quotes (').

The simple variant text forms for nouns provide text for irregular plurals. For example, the noun "platinum" can be defined with metadata according to the following two examples, wherein the symbol "-" is recognized by the localization engine 504 as an instruction to suppress addition of characters, such as "s", for a plural form:

{n}platinum{pl=platinum}
{n}platinum{pl=-}

These two contextual definitions have the same effect. Depending on count, they could become "0 platinum", "1 platinum", or "10,000 platinum". The minus symbol "-" is interpreted by the localization engine 504 as "don't add anything to form the plural". In one embodiment, text for the plural form of a noun may be defined by inserting an "s" or "es" after the "-" symbol in defining the plural form, wherein the characters provided after the "-" symbol are added to the base text to form the plural form of the noun.

Another form of variant text manages gender variants, wherein one or more characters or symbols can be used to identify the case in which the variant text is to be used. In the following example, the character "f" is used to identify the case in which the gender of the noun is feminine, and the character "n" is used to identify the case in which the gender of the noun is male.

{n}actor{f=actress}
{n} actress {m=actor}

These two metadata extended context examples have the same effect, wherein localization engine 504 uses the base text "actor" unless the context provided by the software application indicates that the gender is feminine, in which case use the text "actress". In the second example, the localization engine 504 uses the base text "actress" unless the context provided by the software application indicates that the gender is male, in which case the text "actor" is used. In both examples, the localization engine 504 will apply the standard pluralization rules after gender selection, wherein the text "actor" becomes "actors", and the text "actress" becomes "actresses" for a count greater than one.

Alternatively, all forms for the noun can be provided for each combination of gender and count scenarios. For the actor/actress example, the metadata can be expanded as follows, and the second example is provided for reference:

{n}actor{fs=actress, fp=actresses, ms=actor, mp=actors}
{n}actor{f=actress}

As implemented, these two examples will result in the same output. For the first example, where the feminine singular context is provided by the software application, the localization engine 504 uses the "fs=" variant. In the second example, the most precise variant for the feminine singular context is the plain feminine "f=", so the localization engine 504 will use the text "actress". If instead the context provided by the software application is feminine plural, the localization engine 504 uses the "fp=" variant in the first example. In the second example, the most precise variant for the feminine plural context is "f=", so the localization engine 504 will use the text "actress" and use the standard pluralization rules to form the plural.

In one embodiment, metadata may include a pointer to increase flexibility. In one embodiment, the pointer can be referred to as a 'this pointer'. A this pointer is a token with a predefined symbol as its operand, wherein the this pointer operand may be represented by the symbol "@", for example. In the following two examples, the numbered operand is defined with the base text "a snake egg". The plural form of the base text is defined with metadata as "+@ snake eggs", wherein the localization engine 504 looks to the count context for the base text in response to the "+@" token in the event the count is greater than one:

| | | |
|---|---|---|
| 1 | {n}a snake egg{pl = "+@ snake eggs"}, 1 | |
| template | "Bring me $1!" | |
| output | "Bring me a snake egg!" | |
| 1 | "{n}a snake egg{pl = "+@ snake eggs"}, 7 | |
| template | "Bring me $1!" | |
| output | "Bring me 7 snake eggs!" | |

In the first example, the count for the numbered operand "1" is one, so the singular or default version of the base text is applied to the TML text template and output accordingly. In the second example, the context provided with the numbered argument is 7, which is greater than one so the localization engine 504 uses the plural form of the base text as defined by the plural identifier "pl=". According to the this pointer, the localization engine 504 outputs the count for the numbered argument in response to the token "+@" and outputs the desired grammatically correct text string.

One embodiment of the translation tool includes the use of ranged and numbered plurals which provide more precise control over the singular and plural forms of variant text. The following example illustrates the use of context defining different variant texts for different counts of the numbered argument:

| | |
|---|---|
| 1 | "{n}snake egg{1= "a snake egg",2="a couple snake eggs",3-6="a few snake eggs",7-11="several snake eggs",12="a dozen snake eggs",20="a stack of snake eggs",pl="+@ snake eggs"}, 20 |
| template | "Bring me $1!" |
| output | "Bring me a stack of snake eggs!" |

The localization engine 504 uses the most precise variant match it can find in the metadata, and ranged plurals are treated as more precise. Since there is a count match for 20 in this example, the localization engine 504 outputs the text "a stack of snake eggs" for the token "$1". If the context were 13 there is no precise match, and the localization engine 504 would use the general plural form and output "13 snake eggs".

In one embodiment of the translation tool, ranged plurals can also be gender specific, wherein two or more characters or symbols identify the gender and count for which the variant text is to be used. In the following example, the base text is "actor", but when the gender is feminine and the count does not correspond to one of the identified counts, the localization engine 504 replaces the token with the text "actress". In the case where the gender is feminine and the count is 2, the variant text "actress twins" is used, and when the gender is feminine and the count is 20, the variant text "stack of actresses" is used, for example. The following two examples illustrate the use of different variant text in response to designation of a different count in the context for the numbered argument "1".

| | |
|---|---|
| 1 | "{n}actor{fem=actress,f2="actress twins",f20="stack of actresses",f3+="bevy of actresses",m2="actor buddies",m20="beefcake stack", m3+="rat pack"}, 19, female |
| template | "Beware the evil $1!" |
| output | "Beware the evil bevy of actresses!" |
| 1 | "{n}actor{fem=actress, f2 = "actress twins",f20 = "stack of actresses",f3+ = "bevy of actresses",m2 = "actor buddies",m20 = "beefcake stack",m3+ = "rat pack"}, 20, female |
| template | "Beware the evil $1!" |
| output | "Beware the evil stack of actresses!" |

In one embodiment, the localization engine 504 uses the first variant text match it finds in the variant text identifiers. Where the count is 19, the first feminine variant match for the above example is "bevy of actresses", and the localization engine 504 uses this text to parse the token "$1". Where the count is 20, the "f20=" identifier was a successful feminine match before the localization engine 504 reached the more broad identifier "f3+=", so the localization engine 504 stopped at the "f20=" identifier and used the defined variant text. In the case where the gender provided by the software application is male, the localization engine 504 would have supplied "rat pack" and "beefcake stack" in each example, respectively.

For verbs, there are typically six variants for the English language and more or less for other target languages. In one embodiment, the variant verb forms comprise first, second, and third person for each a singular and plural form. Each of the variant forms of a verb can be defined with metadata, or the most common verb form can be used as the default or base text and the uncommon or different forms defined specifically as variant text. The following is an example of three different methods of defining variant forms for the verb "buy" such that the appropriate form of the verb is used to parse a TML text template:

{v}buy{1s=buy,2s=buy,3s=buys,1p=buy,2p=buy, 3p=buy}
{v}buys {1s=buy,2s=buy,1p=buy,2p=buy,3p=buy}
{v}buy{3s=buys}

These three methods have substantially the same effect when implemented by the localization engine 504. If a specific form is missing from the variants, the localization engine 504 uses the default base text. In this example, "1s" identifies the first person singular variant text, "2s" identifies the second person singular variant text, "3s" identifies the third person singular variant text, "1p" identifies the first person plural variant text, "2p" identifies the second person plural variant text, and "3p" identifies the third person plural variant text. For the verb "buy", the conjugation is the same except for the third person singular case. Accordingly, as illustrated in the last method, only the third person singular variant text needs to be defined.

In English, for example, forms of a verb are most likely to vary between third person singular and third person plural. The following is an example where the third person singular form of the verb "cost" is defined with metadata, wherein the context for the verb is based on the target of the template, and wherein the target is a noun with a singular count.

| | |
|---|---|
| target | "{n}a snake egg{pl="+@ snake eggs"}, 1 |
| 1 | "{v}cost{3s=costs}" |
| 2 | "{n}platinum{pl=-}", 3 |
| template | "$T $1|t +2 $2." |
| output | "A snake egg costs 3 platinum." |

In the present example, the localization engine 504 determines that the third person singular form of the verb "cost" should be used, and the third person singular form is defined with metadata as "costs". Accordingly, the "$1|t" token is parsed with the verb text "costs". In the following example, the count of the target is increased to 20, and therefore the third person plural form of the verb "cost" should be used.

| | |
|---|---|
| target | "{n}a snake egg{pl="+@ snake eggs"}, 20 |
| 1 | "{v}cost{3s=costs}" |
| 2 | "{n}platinum{pl=-}", 60 |
| template | "$T $1|t +2 $2" |
| output | "20 snake eggs cost 60 platinum." |

Because the third person plural identifier does not appear in the metadata, the localization engine 504 uses the default or base text for the verb, which in this case is the correct form for third person plural.

As discussed above, the translation tool can include a lookup table in one embodiment, wherein base text in addition to metadata and context is stored in a table in memory, such as the source/database memory (304/408), with a numbered or alphanumeric address. In one embodiment, the lookup table is a numbered list of text strings, wherein the text strings are a glossary of available text for use by the software application in providing context to the translation tool. The contents of the glossary can be modified, wherein the modification is propagated throughout the use of the glossary in both the software application and the translation tool. The lookup table can comprise phrases, for example, where phrases allow some of the same gender and count variants as nouns. In addition, phrases in the lookup table may also include tokens for parsing and expansion by the localization engine 504.

The localization engine 504 is directed to the lookup table with a predefined token operator, such as the symbol "\", and the token operand is the address or identification of the specific table location where the base text or phrase is stored. In the following example, a phrase is stored in the lookup table at address "413", wherein a variant phrase is defined for the case wherein the context pointed to designates the female gender. The localization engine 504 needs additional information to parse the template phrase from the lookup table, so the supplemental information "|L" instructs the localization engine 504 to use the context provided for the listener in parsing the template phrase from the lookup table.

| \413 | "{p}Attacking <(t), master.{f= "Attacking <(t), mistress."}" |
|---|---|
| target | "orc pawn", 1, male, subhuman |
| listener | "Galadriel", 1, female, human |
| template | "\413|L" |
| output | "Attacking an orc pawn, mistress." |

In the above example, the gender context provided for the listener is female, therefore the localization engine 504 uses the variant phrase identified for the female gender at the lookup table address "413", and parses the template for the variant phrase according to the context provided for the target.

| \413 | "{p}Attacking <(t), master.{f="Attacking <(t), mistress."}" |
|---|---|
| target | "orc pawn", 1, male, subhuman |
| listener | "Gandalf", 1, male, human |
| template | "\413|L" |
| output | "Attacking an orc pawn, master." |

In this example, the gender context provided for the listener is male, therefore the localization engine 504 uses the base text or default phrase at the lookup table address "413", and parses the default phrase template using the context provided for the target.

Supplemental information used in conjunction with the lookup table is not limited to supplemental details, and supplemental directives may also be used. For example, the extended token "\413|(sx=f)" instructs the localization engine 504 to select the female gender version of the phrase stored at the lookup table address "413". Generally, "sx=", "ct=" and "obj=" directives can be applied to nouns and phrases to command selection of particular variants.

In one embodiment, two types of phrases are defined because they are commonly used. The first type of phrase is identified with the metadata "{ps}" and is a phrase wherein the gender and count are taken from the context of the speaker. The second type of phrase is identified with the metadata "{pl}" and is a phrase wherein the gender and count are taken from the context of the listener. The invocation syntax for these phrases is simpler ("\414" rather than "\414|L") than standard phrases ({p}) because no supplemental details (the "|L") are needed. A secondary benefit of these predefined phrases is that they are more easily substituted in conjunction with other text that does not require the supplemental details. The following is an example of a use of the listener based phrase ({pl}) in combination with the lookup table.

| \414 | "{pl}Attacking <(t), master.{f="Attacking <(t), mistress."}" |
|---|---|
| target | "orc pawn", 1, male, subhuman |
| listener | "Galadriel", 1, female, human |
| template | "\414" |
| output | "Attacking an orc pawn, mistress." |

In this example, the result is the same as when the basic phrase ({p}) was used in combination with the supplemental details, but the TML text template is shorter because the supplemental information instructing the localization engine 504 to use the context of the listener is removed from the template.

The following are two additional examples of the use of the {ps} and {pl} metadata wherein the two examples use the same TML text template but produce different results depending on the context:

| speaker | "Bob" |
|---|---|
| listener | "Jane", female |
| 0 | "\414" |
| \414 | "{ps}I tore my shirt{f='I tore my dress'}" |
| template | "$S says, '$0'." |
| output | "Bob says, 'I tore my shirt.'" |
| speaker | "Fido" |
| listener | "Jane", female |
| 0 | "\415" |
| \415 | "{pl}My master $L loves me{f='My mistress loves me'}" |
| template | "$S says, '$0'." |
| output | "Fido says, 'My mistress Jane loves me.'" |

In the above examples, the same template can be used where the gender and count to be used for the token "$0" are referenced to either the listener or the speaker, and such designation does not need to appear in the TML text template in the "$0|L" or the "$0|S" form.

Figure 8:
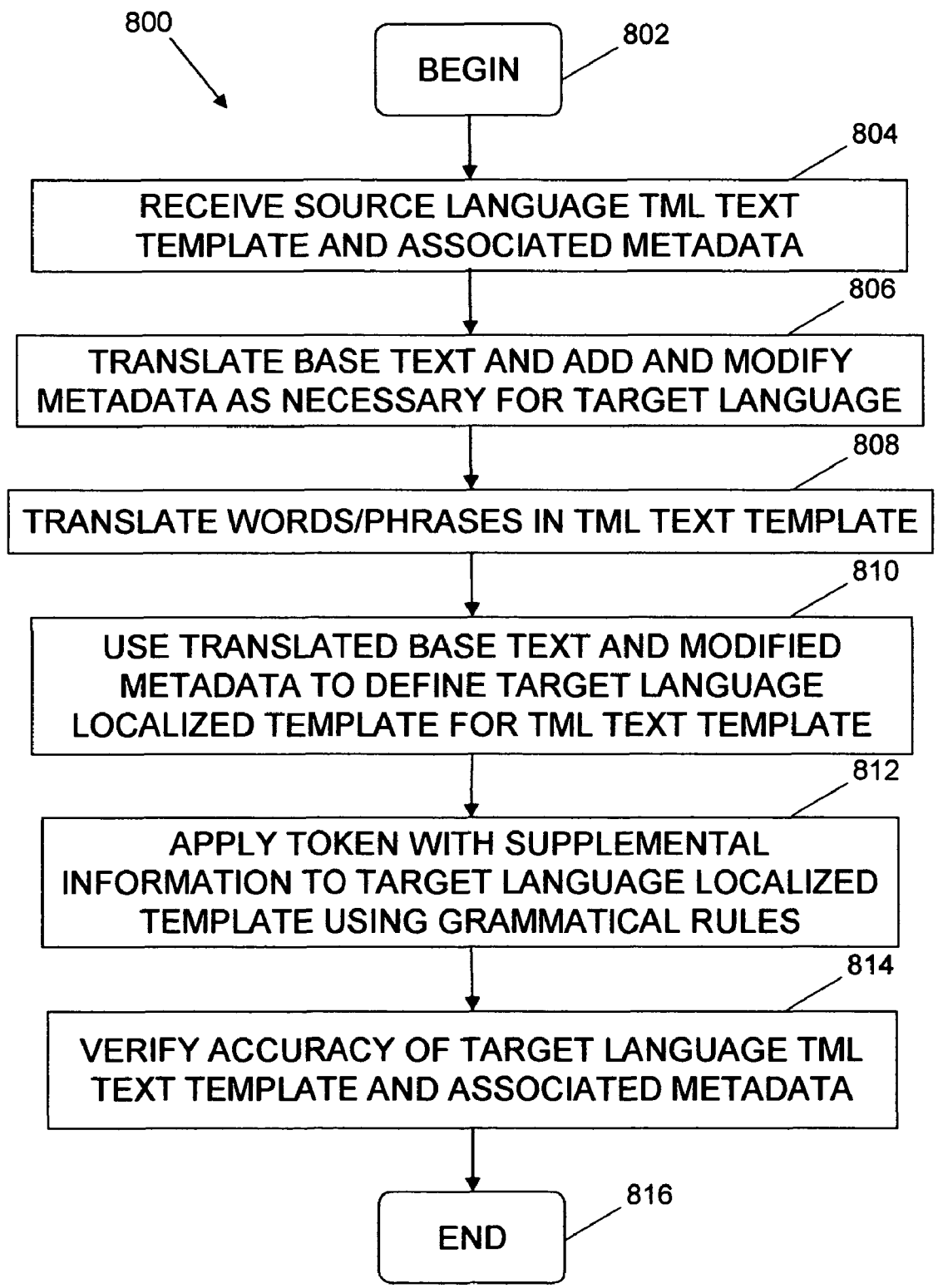
FIG. 8 is a flowchart illustrating one embodiment of a method of generating an accurate TML text template and metadata in a target language based on a TML text template and metadata in a source language.
Figure 9:
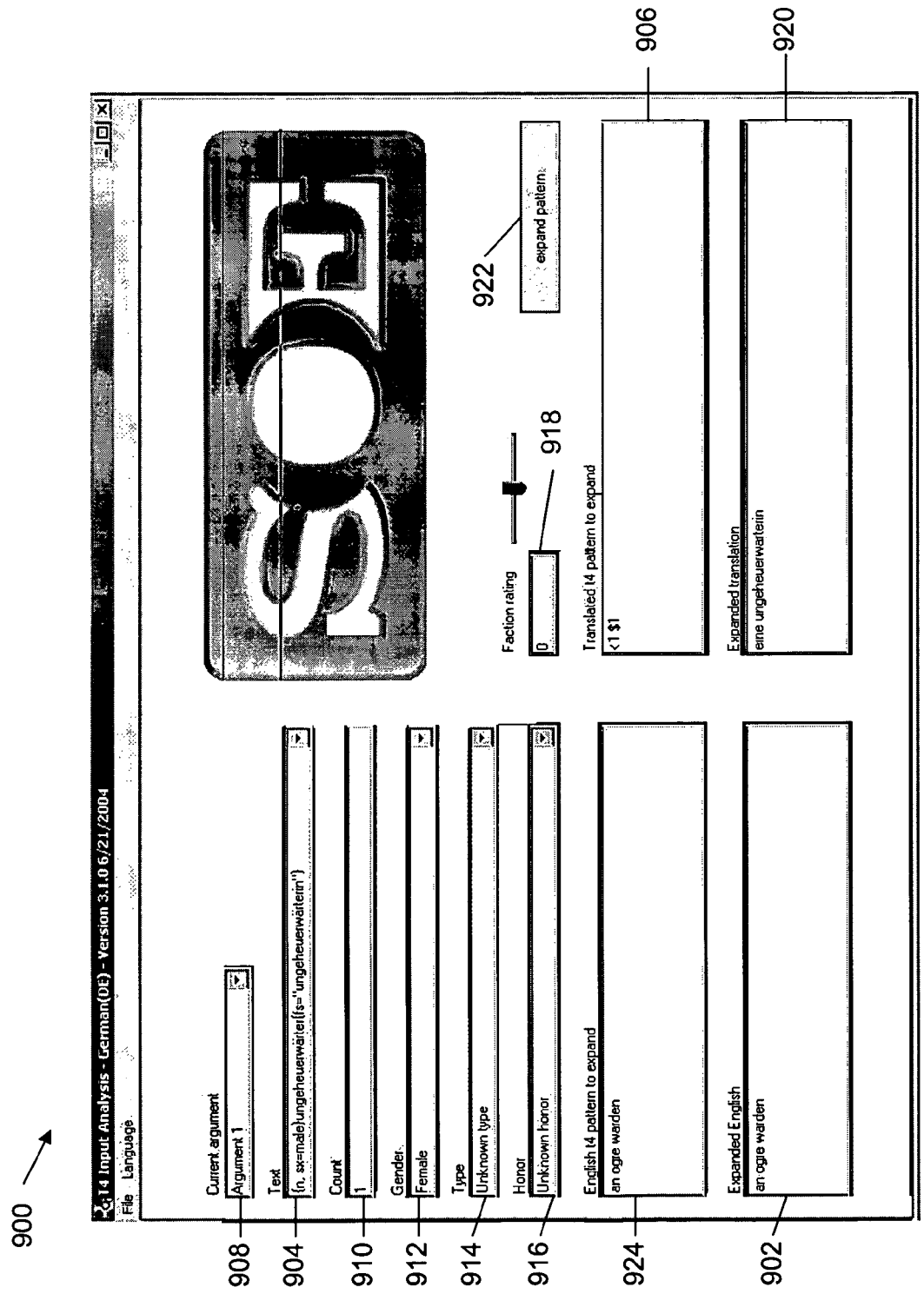
FIG. 9 is an illustration of one embodiment of a translator interface for generating an accurate TML text string in a target language based on a TML text string in a source language.

The TML text templates generated according to the method 700 of FIG. 7 and metadata in a source language generated according to the above methods are used by translators to generate an accurate TML text template and metadata in a target language. FIG. 8 is a flowchart illustrating one embodiment of a method 800 of generating an accurate TML text template and metadata in a target language based on a TML text template and metadata in a source language. In one embodiment, the method 800 is implemented using the translator development tool 36 (FIG. 1), which provides a translator interface such as the interface illustrated in FIG. 9. In one embodiment, the method 800 implements the process steps 610 and 615 of the method 600 of FIG. 6. The method 800 may be performed manually or it may be automated, or the method may comprise a combination of both automated and manual processes.

Referring to FIG. 8, the method begins at a step 802 and proceeds to a step 804 wherein the translator receives one or more source language TML text templates and associated base text and metadata. The following is an exemplary source language TML text template and exemplary base text and metadata:

| | |
|---|---|
| 0 | "gauntlet", 2, object, normal |
| 1 | "beautiful", 0 |
| 2 | "silver", 0 |
| template | "You buy <1 $1 $2 $0" |

In one embodiment, the source language TML text template and associated metadata are provided in a chart or table, each with a predefined address. Following receipt of the source language TML text template and associated base text and metadata in step 804, the translator translates the base text and adds and modifies the metadata as necessary for the target language. In the present example the target language is French, and the source language metadata can accordingly be modified in step 806 and base text translated as follows to define variant forms of the base text and a default gender:

| | |
|---|---|
| 0 | "{n, sx=m}gantelet{}", 2, object, normal |
| 1 | "{ap}beau{ma=bel, fs=belle, fp=belles}", 0 |
| 2 | "{a}argenté{}", 0 |

As discussed above, the part of speech for a word assigned to a numbered argument is designated with metadata in the context. In a number of languages, such as French, the order of a noun and one more adjectives may not be grammatically correct if the order from the English template is used. Thus, the part of speech designations {n}, {ap}, {a} are useful for some locales in generating grammatically correct text. An additional variant text identifier is used in the context for the numbered argument "1" in the present example which is particular to the French target language. Specifically, the identifier "ma" designates the masculine aspire form of the adjective "beau", that is the form when the adjective is placed in front of a masculine noun that begins with a vowel or mute "h". Additional variant text identifiers may be used for each target language that are unique to that target language, or identifiers common to some locales may also be used.

Following addition and modification of metadata in step 806, the translator translates words or phrases in the TML text template in a step 808. In the present example, the translator translates the phrase "You buy" to "Vous achette" for the French target language in step 808. Following translation of words or phrases in the TML text template to the target language in step 808, the translator uses the translated base text and modified metadata to define a target language localized template for the source language TML text template in a step 810. In French, adjectives must match case with the gender and count of the noun which they modify, and placement of an adjective with respect to a noun may depend on the meaning of the adjective. Accordingly, the translator defines a target language localized template that reflects this rule.

In one embodiment, a macro can be used to define the target language localized template, wherein the macro is an extended token comprising a predefined token operator such as the symbol "\" and supplemental information. In one embodiment, a macro is used by the localization engine 504 to implement a localized grammatical rule coded into the localization engine 504. For example, a macro "\noun( . . . )" can be used to invoke a rule that orders adjectives around a noun according to accurate French grammatical rules. Such a rule may be coded into the localization engine for the French target language, for example. In the present example, the macro would be defined as "\noun($0, $1, $2), wherein the first argument within the parenthetical can be assumed the noun, and all remaining arguments are adjectives.

Following definition of the target language localized template in step 810, the token or tokens with supplemental information are applied to the target language localized template using grammatical rules in a step 812. For the present example, the translator would define the following target language localized template by applying the macro extended token to the localized template in step 812:

template "Vous achette \noun($0, $1, $2)"

In the present example, the macro token is applied to the target language localized template according to French grammatical rules, wherein the translator development tool analyzes the modified metadata for the numbered arguments "1" and "2" to determine the type of adjective. In this example, the numbered argument "1" defines a prefix adjective and the numbered argument "2" defines a suffix adjective. According to the French grammatical rule coded at the localization engine 504, the localization engine 504 would expand the macro and generate the following target language localized template:

template "Vous achette $1|0 $0 $2|0"

Following application of the extended token(s) to the target language localized template in step 812, the translator verifies the accuracy of the target language TML text template and associated metadata in a step 814. This verification can be performed using the translator development tool 36 and translator interface 900 illustrated in FIG. 9, for example. In the event the target language TML text template and associated metadata are inaccurate, the translator can modify the metadata and/or the target language TML text template such that the TML text template and metadata will produce a grammatically correct text string in the target language when expanded by the localization engine 504. Upon verification of the accuracy of the target language TML text template and associated metadata in step 814, the method 800 ends in a step 816.

The target language TML text template and associated metadata generated according to the method 900 are stored at the database 510 (see FIG. 5) in relation to their corresponding TML text template and base text in the source language for lookup by the translation markup language lookup module 506. In one embodiment, the source language TML text templates are referenced with an address instead of the template itself, and the address corresponds to the target language TML text templates as addressed in the database 510.

In one embodiment, the designated grammar rules for the above defined token operator symbols are customized according to the needs of the locale target language. For example, the following set of designated grammar rules can be applied to the same set of symbols for the German locale:

$: name (Bob) or base text
%: nominative pronoun (ich/du/er-sie-es etc.)
: accusative pronoun (mich/dich/inh-sie-es etc.)
~: dative pronoun (mir/dir/ihm-ihr-ihm etc.)
*: reflexive pronoun (mich/dich/sich, mir/dir/sich, etc.)
&: possessive adjective (mein/dein/sein-ihr-sein etc.)
<: indefinite article (ein*/kein*/einige/viele)
>: definite article (der/die/das, den/die/das, dem/der/dem, des/der/des, etc.)
+: count/number of the objects
^: genitive form of a noun (Kunden)
=: direct address (gender & respect from context, Herr/Dame)

The translator may use this set of designated grammar rules to define the target language TML text template.

As discussed above, the translator interface 900 of FIG. 9 may be used in conjunction with the method 800 and particularly to verify the accuracy of a target language TML text template and associated data. In one embodiment, the translator interface 900 comprises a source language text string input section 902 configured to display a text string in a source language as input by a user. The translator interface 900 further comprises a variable or base text input section 904 configured to display variable or base text in the target language as input by a user. This variable text may include metadata.

The translator interface 900 also comprises a target language TML text string input section 906 configured to display the target language TML text string defined by a user according to the method 800 illustrated in FIG. 8, for example. The translator interface 900 further comprises an argument input section 908 configured to display the current argument for which variable text is displayed and modified in the variable text input section 904, wherein the current argument may be one of target, actor, pet, master, speaker, listener, or numbered argument 0-9, for example. The translator interface 900 also includes one or more context input sections configured to display at least one context element as input by the user for use in expanding the target language TML text template displayed in the section 906. The one or more context input sections may include a count input section 910, a gender input section 912, a type input section 914, an honor or honorific input section 916, and a faction input section 918, for example. The input for the context elements may be manually input by a user or chosen from a predefined set of inputs through a drop-down menu, for example.

The translator interface 900 further comprises a target language text string output section 920 configured to display a text string in the target language in response to user selection of an expand pattern input 922. In response to user selection of the expand pattern input 922, the translator development tool generates the target language text string based on an expansion of the target language TML text template using the variable text defined in connection with the argument input section 908, and at least one context element from the context element input sections 912, 914, 916, 918. The translator interface may further comprise a source language text input section 924, wherein the text displayed at the input 924 is used to define the target language TML text string displayed at input section 906.

The modified metadata and accurate target language TML text templates generated according to method 800 are stored in memory, such as the database 510 (FIG. 5) with reference to their corresponding source language metadata and TML text template.

Figure 10:
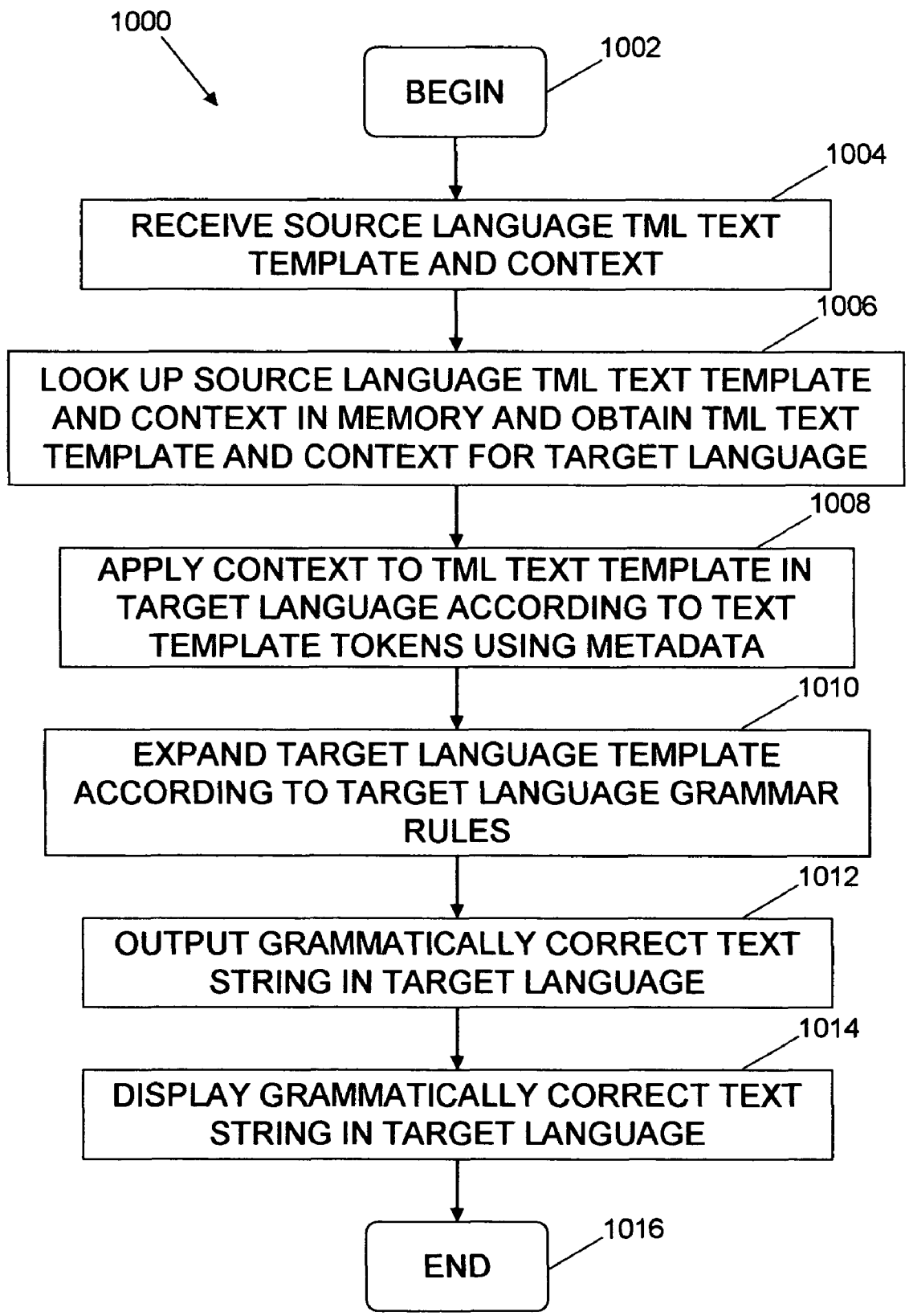
FIG. 10 is a flowchart illustrating one embodiment of a method of generating and displaying a grammatically correct text string in a target language based on context and a TML text template in a source language.

FIG. 10 is a flowchart illustrating one embodiment of a method 1000 of generating and displaying a grammatically correct text string in a target language based on context and a TML text template in a source language. The method 1000 begins in a step 1002 and proceeds to a step 1004 wherein the translation application interface 502 at the translation module 500 receives a source language TML text template and context as provided by the software module 306 or 404 (see FIGS. 3 and 4). In one embodiment, the translation application interface 502 communicates the source language TML text template and context to the localization engine 504. In a step 1006, the localization engine 504 looks up the source language TML text template and source language context in memory (cache 508 or database 510) with the assistance of the TML lookup module 506 and obtains a corresponding target language TML text template and context in the target language. In addition, in the case where the context received in step 104 contains one or more tokens with an address lookup, for example, step 1006 includes lookup of the address wherein the localization engine 504 obtains the contents of the address.

In a step 1008, the localization engine 504 applies the target language context to the target language TML text template according to the text template tokens using the metadata provided with the target language context. In one embodiment, the localization engine 504 applies the target language context in reference to the source language context according to rules coded into the localization engine 504. In a step 1010, the localization engine 504 expands the target language TML text template according to target language grammar rules stored, for example, in the cache 508 or database 510. In a step 1012, the localization engine 504 communicates the expanded target language TML text template to the translation application interface 502, which outputs the grammatically correct text string in the target language in a step 1012 to the software module 306 or 404, for example. In a step 1014, the display module 302 at the client 16 displays the grammatically correct text string in the target language, and the method 1000 ends in a step 1016.

In some embodiments, where the grammatically correct text string is generated by the translation module 406 at the server 18, for example, the software module 404 communicates the grammatically correct text string in the target language to the client communication module 402, which transmits the grammatically correct text string to the client 16 via the network 20.

The following is an exemplary execution of the method 1000. The translation application interface 502 may receive the following context and text template in a source language, which in this case is English, in step 1004 of the method 1000:

| | |
|---|---|
| 0 | "gauntlet", 2, object, normal |
| 1 | "beautiful", 0 |
| 2 | "silver", 0 |
| template | "You buy <1 $1 $2 $0" |

In step 1006, the localization engine 504 looks up the source language TML text template and source language context in memory with the assistance of the TML lookup module 506 and obtains the following corresponding target language TML text template and context in the target language, wherein the target language for the present example is French.

| | |
|---|---|
| 0 | "{n, sx=m}gantelet{}", 2, object, normal |
| 1 | "{ap}beau{ma=bel, fs=belle, fp=belles}", 0 |
| 2 | "{a}argenté{}", 0 |
| template | "Vous achette \noun($0, $1, $2)" |

In step 1008, the localization engine 504 applies the target language context to the target language TML text template token using the metadata provided with the target language context. In a step 1010, the localization engine 504 expands the target language TML text template according to the target language grammar rules, which in the present case are the rules for the target language French. According to the French grammar rules, the target language TML text template would be expanded such that the template would be replaced with the following expanded template:

template "Vous achette $1|0 $0 $2|0"

In a step 1012, the localization engine 504 would output the following grammatically correct string via the translation application interface 502:

output "Vous achette beaux gantelets argentés"

In a step 1014, the display module 302 displays this grammatically correct text string in the target language, and the method ends in step 1016.

As will be appreciated by those skilled in the technology, the target languages and syntax described herein is exemplary in nature and do not limit the scope of the invention. In addition, the person skilled in the technology would be able to implement the methods and systems described herein in a plurality of implementation environments and with more complex or simplistic text strings and grammatical rules. These implementations and varieties of text strings and grammatical rules are within the scope of the invention. The grammatical rules and text strings described herein are exemplary in nature and additionally complex text strings and variety of locales or target languages are contemplated. For example, the invention is not limited to European locales and may be implemented in a variety of locales where the language used may be a modified form of English, such as the United Kingdom wherein a predefined set of words are used in place of preferred words in English or the locale uses preferred spellings, or a language other than English.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A translation development server configured to generate a grammatically correct text string in a target language based on a source language text string, the server comprising:
    an interface configured to receive the source language text string, and generate a source language text template based at least in part on variable elements of the source language text string, the source language text template comprising one or more tokens which represent words or phrases in the source language text string, and the one or more tokens including a token operator and a token operand,
    wherein the token operator is assigned to a variable text element, the variable text element analyzed to identify a context type of the variable text element which is assigned to the token operand;
    a translator development tool configured to operate in conjunction with the source language text template and source language metadata to generate corresponding target language text template, target language metadata, and one or more target language grammatical rules; and
    a translation tool to generate the target language text template and the target language metadata corresponding to the source language text template and the source language metadata by parsing and translating the source language text template into the target language text template using the token operator, the token operand, and the source language metadata, the translation tool further configured to generate the text string in the target language using the target language text template, the target language metadata, and the one or more target language grammatical rules.

2. The server of claim 1, wherein the context type includes at least one of number, gender, type of object, rank, age, and faction.

3. The server of claim 1, further comprising
    a plurality of client devices, each client device including a translation tool configured to operate in conjunction with the translation development tool to generate the grammatically correct text string in the target language based on the source language text string.

4. A method of generating a grammatically correct text string in a target language based on a source language text string, the method implemented in a client-server system and comprising:
    receiving the source language text string from at least one of client and server text string, and generating a source language text template based at least in part on variable elements of the source language text string within at least one of client and server, the source language text template comprising one or more tokens which represent words or phrases in the source language text string, and the one or more tokens including a token operator and a token operand,
    wherein the token operator is assigned to a variable text element, the variable text element analyzed to identify a context type of the variable text element which is assigned to the token operand;
    generating a target language text template and target language metadata corresponding to the source language text template and the source language metadata by parsing and translating the source language text template into the target language text template using the token operator, the token operand, and the source language metadata within at least one of client and server; and
    generating the text string in the target language using the target language text template, the target language metadata, and one or more target language grammatical rules within at least one of client and server.

5. The method of claim 4, wherein generating the text string in the target language further comprises
    expanding the target language text template according to the one or more target language grammar rules.

6. A computer readable medium configured to store a program executing a method of generating a grammatically correct text string in a target language based on a source language text string, the program comprising executable instructions that cause a computer to:
    receive the source language text string, and generate a source language text template based at least in part on variable elements of the source language text string, the source language text template comprising one or more tokens which represent words or phrases in the source language text string, and the one or more tokens including a token operator and a token operand,
    wherein the token operator is assigned to a variable text element, the variable text element analyzed to identify a context type of the variable text element which is assigned to the token operand;
    generate a target language text template and target language metadata corresponding to the source language text template and the source language metadata by parsing and translating the source language text template into the target language text template using the token operator, the token operand, and the source language metadata; and
    generate the text string in the target language using the target language text template, the target language metadata, and one or more target language grammatical rules.

7. The computer readable medium of claim 6, wherein the context type comprises at least one of number, gender type, rank, age, and faction.

8. A computer gaming system configured to a generate grammatically correct text string in a target language based on a source language text string, the system comprising:
- a translation development server;
- a game console in communication with the translation development server via a network, the game console including a game software module configured to receive the source language text string, and generate a source language text template based at least in part on variable elements of the source language text string, the source language text template comprising one or more tokens which represent words or phrases in the source language text string, and the one or more tokens including a token operator and a token operand,
- wherein the token operator is assigned to a variable text element, the variable text element analyzed to identify a context type of the variable text element which is assigned to the token operand;
- the translation development server comprising:
  - a translator development tool configured to receive the source language text template and source language metadata from the game software module to generate corresponding target language text template, target language metadata, and one or more target language grammatical rules; and
  - a translation tool to generate the target language text template and the target language metadata corresponding to the source language text template and the source language metadata by parsing and translating the source language text template into the target language text template using the token operator, the token operand, and the source language metadata, the translation tool further configured to generate the text string in the target language using the target language text template, the target language metadata, and the one or more target language grammatical rules.

9. The system of claim 8, wherein the context type includes at least one of number, gender, type of object, rank, age, and faction.

10. A translation system configured to generate a grammatically correct text string in a target language based on a source language text string, the translation system comprising:
- a translation application interface configured to receive a source language text template from a software module of a computer game,
- wherein the source language text template is generated based at least in part on variable elements of the source language text string, the source language text template comprising one or more tokens which represent words or phrases in the source language text string, and the one or more tokens including a token operator and a token operand,
- wherein the token operator is assigned to a variable text element, the variable text element analyzed to identify a context type of the variable text element which is assigned to the token operand; and
- a localization engine configured to operate in conjunction with the translation application interface module to generate the grammatically correct text string in the target language.

11. The system of claim 10, wherein the localization engine generates the grammatically correct text string in the target language by:
- coding target language grammatical rules;
- searching lookup tables for a target language text template and a target context corresponding to the source language text template and the context type;
- applying the target context to the target language text template to expand the target language text template according to the target language grammatical rules;
- outputting the expanded target language text template as the grammatically correct text string in the target language.

12. A computer-implemented method of generating a grammatically correct text string in a target language based on a source language text string, the method implement in a client-server system and comprising the method comprising:
- generating a source language text template based on the source language text string within at least one of client and server, the source language text template including at least one token, wherein the at least one token includes:
- a token operator assigned to a variable text element included in the source language text string, wherein a first symbol is designated as the token operator, and wherein the first symbol corresponds to a predefined source language grammar rule, and
- a token operand assigned to the variable text element, wherein a second symbol is designated as the token operand, and wherein the second symbol corresponds to a predefined context type;
- translating one or more words in the source language text template to one or more words in the target language so as to generate a target language text template within at least one of client and server; and
- defining the text string in the target language from the translated target language text template according to target language grammatical rules within at least one of client and server.

13. The method of claim 11, further comprising
adding and modifying mctadata for a variant text associated with the source language text string according to attributes of the target language, wherein the text string in the target language is defined using the modified metadata in addition to the translated target language text template.

14. The method of claim 13, further comprising
modifying the text string in the target language with supplemental information, wherein the supplemental information includes at least one of supplemental details and supplemental directives.

* * * * *